United States Patent
Padebettu

(10) Patent No.: US 11,324,057 B2
(45) Date of Patent: May 3, 2022

(54) SUPPORTING MULTIPLE PDU SESSIONS FOR 5G CLIENT DEVICES ON WIRELINE ACCESS

(71) Applicant: Juniper Networks, Inc., Sunnyvale, CA (US)

(72) Inventor: Venkatesh Padebettu, Bangalore (IN)

(73) Assignee: Juniper Networks, Inc., Sunnyvale, CA (US)

(*) Notice: Subject to any disclaimer, the term of this patent is extended or adjusted under 35 U.S.C. 154(b) by 39 days.

(21) Appl. No.: 16/881,453

(22) Filed: May 22, 2020

(65) Prior Publication Data

US 2021/0321469 A1 Oct. 14, 2021

(30) Foreign Application Priority Data

Apr. 9, 2020 (IN) .............................. 202041015581

(51) Int. Cl.
*H04W 76/12* (2018.01)
*H04L 12/46* (2006.01)

(52) U.S. Cl.
CPC ......... *H04W 76/12* (2018.02); *H04L 12/4633* (2013.01)

(58) Field of Classification Search
None
See application file for complete search history.

(56) References Cited

U.S. PATENT DOCUMENTS

| | | | |
|---|---|---|---|
| 2019/0230198 A1* | 7/2019 | Kurakami | ............... H04L 47/34 |
| 2020/0068385 A1 | 2/2020 | Yu | |
| 2020/0107388 A1* | 4/2020 | Yu | ......................... H04W 76/25 |
| 2021/0022041 A1* | 1/2021 | Allan | .................. H04L 12/4633 |
| 2021/0076301 A1* | 3/2021 | Yu | ......................... H04W 48/08 |

(Continued)

FOREIGN PATENT DOCUMENTS

CN 110536481 A 12/2019

OTHER PUBLICATIONS

3GPP, "3rd Generation Partnership Project; Technical Specification Group Services and System Aspects; Procedures for the 5G System (5GS); Stage 2 (Release 16)," 3GPP Standard; Technical Specification; 3GPP TS23.502, 3rd Generation Partnership Project (3GPP), F-06921 Sophia-Antipolis Cedex; France, Mar. 2020, XP051861092, vol. SA WG2 (V16.4.0), pp. 1-582, [retrieved on Mar. 27, 2020], Retrieved from the Internet: [URL:http://ftp:3gpp.org/Specs/archive/23_series/23.502/23502-g40.zip 23502-g40.docx].

(Continued)

*Primary Examiner* — Jenkey Van
(74) *Attorney, Agent, or Firm* — Harrity & Harrity, LLP

(57) ABSTRACT

A network device may receive a message from a device. The network device may process the message to determine identification information associated with the device. The network device may process the message to determine identification information associated with a packet data unit (PDU) session, of one or more PDU sessions, of the device. The network device may transmit based on the identification information associated with the device and the identification information associated with the PDU session of the device, the message to another network device.

20 Claims, 18 Drawing Sheets

(56) References Cited

U.S. PATENT DOCUMENTS

2021/0168661 A1* 6/2021 Wong .................... H04W 28/26

OTHER PUBLICATIONS

3GPP, "3rd Generation Partnership Project; Technical Specification Group Services and System Aspects; Study on the Wireless and Wireline Convergence for the 5G system architecture (Release 16)," 3GPP Standard; Technical Report 3GPP TR23.716, 3rd Generation Partnership Project (3GPP), F-06921 Sophia-Antipolis Cedex; France, Oct. 2018, XP051487712, vol. SA WG2 (V1.1.0), pp. 1-163, [retrieved on Oct. 31, 2018].

3GPP, "3rd Generation Partnership Project; Technical Specification Group Services and System Aspects; Wireless and Wireline Convergence Access Support for the 5G System (Release 16)," 3GPP Standard; Technical Specification 3GPP TS23.316, 3rd Generation Partnership Project (3GPP), F-06921 Sophia-Antipolis Cedex; France, Mar. 2020, XP051861087, vol. SA WG2 (V16.3.0), pp. 1-82, [retrieved on Mar. 27, 2020], Retrieved from the Internet: [URL http://ftp.3gpp.org/Specs/archive/23series/23.316/23316-g30.zip 23316-g30.docx].

3GPP, "WT-470 5G FMC Architecture," 3GPP Draft; R3-200300, 3rd Generation Partnership Project (3GPP), F-06921 Sophia-Antipolis Cedex; France, Feb. 2020, XP051853870, pp. 1-35, [retrieved on Feb. 12, 2020], Retrieved from the Internet: [URL:https://ftp.3gpp.org/tsg_ran/WG3_Iu/TSGR3_107_e/Docs/R3-200300.zip WT-470_5G_FMC_Architecture_Straw_Ballot_Issue_01.doc].

Anonymous., 3GPP, "WT-456 AGF Functional Requirements," 3GPP Draft; R3-200300, 3rd Generation Partnership Project (3GPP), F-06921 Sophia-Antipolis Cedex; France, 2020, XP051853869, vol. WT-456, pp. 1-91, [retrieved on Feb. 12, 2020], Retrieved from the Internet: [URL:https://ftp.3gpp.org/tsg_ran/WG3_Iu/TSGR3_107_e/Docs/R3-200300.zip WT-456_AGF_Functional_Requirements_Straw_Ballot_Issue_01.doc].

Ericsson., "Updated PDU Session Establishment Procedure for 5G-RG," 3GPP Draft S2-1904340_WAS3121_5G_RG_PDU_SESSION_EST_Procedure_V1, 3rd Generation Partnership Project (3GPP), F-06921 Sophia-Antipolis Cedex; France, Apr. 2019, XP051703709, vol. SA WG2, 3 pages, [retrieved on Apr. 11, 2019], Retrieved from the Internet: [URL:http://www.3gpp.org/ftp/Meetings%5F3GPP%5FSYNC/SA2/Docs/S2%2D1904340%2E.zip].

Extended European Search Report for Application No. EP21161534.9, dated Sep. 1, 2021, 8 pages.

* cited by examiner

| PPPoE (8 bits) | |
|---|---|
| 0 (0x00) | PPP session stage |
| 7 (0x07) | PADO, Offer |
| 9 (0x09) | PADI, Initiation |
| 10 (0x0a) | PADG, Session-grant |
| 11 (0x0b) | PADC, Session-credit response |
| 12 (0x0c) | PADQ, Quality |
| 25 (0x19) | PADR, Request |
| 101 (0x65) | PADS, Session-confirmation |
| 167 (0xa7) | PADT, Terminate |
| 211 (0xd3) | PADM, Message |
| 212 (0xd4) | PADN, Network |

| PPP (16 bits) | |
|---|---|
| 21 | Internet protocol version 4 |
| 37 | Bridging PDU |
| 3d | Multi-link |
| 57 | Internet protocol version 6 |
| 00xx | 5G data |
| 281 | MPLS unicast |
| 283 | MPLS multicast |
| 405b | Vendor-specific protocol |
| 8021 | Internet protocol control protocol |
| 8057 | IPv6 control protocol |
| 805b | Vendor-specific network control protocol |
| 80xx | 5G access stratum |
| c021 | Link control protocol |
| c023 | Password authentication protocol |
| c05b | Vendor-specific authentication protocol |
| c223 | Challenge handshake authentication protocol |
| c227 | Extensible authentication protocol |

FIG. 1G

5G Data Packet

| Octet | 8 | 7 | 6 | 5 | 4 | 3 | 2 | 1 |
|---|---|---|---|---|---|---|---|---|
| 1 | Version | | | RQoS | Flags | | | |
| 2 | QFI | | | | | | | |
| 3 | PDU Session ID [Octet 1] | | | | | | | |
| 4 | PDU Session ID [Octet 2] | | | | | | | |
| 5 | PDU Session ID [Octet 3] | | | | | | | |
| 6 | PDU Session ID [Octet 4] | | | | | | | |
| 7 | PPP Protocol [Octet 1] | | | | | | | |
| 8 | PPP Protocol [Octet 2] | | | | | | | |
| | Payload | | | | | | | |

SUPPORTING MULTIPLE PDU SESSIONS FOR 5G CLIENT DEVICES ON WIRELINE ACCESS

CROSS-REFERENCE TO RELATED APPLICATION

This application claims priority to Indian Provisional Application No. 202041015581 entitled "SUPPORTING MULTIPLE PDU SESSIONS FOR 5G CLIENT DEVICES ON WIRELINE ACCESS," filed on Apr. 9, 2020. The entire content of which is expressly incorporated herein by reference.

BACKGROUND

A client device (e.g., a residential gateway, a user equipment (UE), and/or the like) may be connected to a fifth generation (5G) core network using wireline access (e.g., transmission of information over a physical element, such as a fiber optic able, a coaxial cable, a twisted pair cable, and/or the like). In such an arrangement, the client device may need to transmit messages (e.g., packet data units (PDUs)) on the wireline access when the client device is connected to the 5G core network using the wireline access.

SUMMARY

According to some implementations, a method may include receiving, by a network device, a message from a device; processing, by the network device, the message to determine identification information associated with the device; processing, by the network device, the message to determine identification information associated with a packet data unit (PDU) session, of one or more PDU sessions, of the device; and transmitting, by the network device, based on the identification information associated with the device and the identification information associated with the PDU session of the device, the message to another network device.

According to some implementations, a network device may include one or more memories and one or more processors to receive a message from a device, wherein the message includes a plurality of encapsulated packets; process a first encapsulated packet, of the plurality of encapsulated packets, to determine identification information associated with the device; process a second encapsulated packet, of the plurality of encapsulated packets, to determine identification information associated with a PDU session, of one or more PDU sessions, of the device; and transmit, based on the identification information associated with the device and the identification information associated with the PDU session of the device, the message to another network device.

According to some implementations, a non-transitory computer-readable medium may store one or more instructions. The one or more instructions, when executed by one or more processors of a network device, may cause the one or more processors to: receive a message from a device, wherein the message includes a plurality of encapsulated packets; process a first encapsulated packet, of the plurality of encapsulated packets, to determine identification information associated with the device; process a second encapsulated packet, of the plurality of encapsulated packets, to determine identification information associated with a PDU session, of one or more PDU sessions, of the device; identify, based on the identification information associated with the device and the identification information associated with the PDU session of the device, a tunnel between the network device and another network device; and transmit, via the tunnel, the message to the other network device.

BRIEF DESCRIPTION OF THE DRAWINGS

FIGS. 1A-1L are diagrams of one or more example implementations described herein.

DETAILED DESCRIPTION OF PREFERRED EMBODIMENTS

Figure 1A:
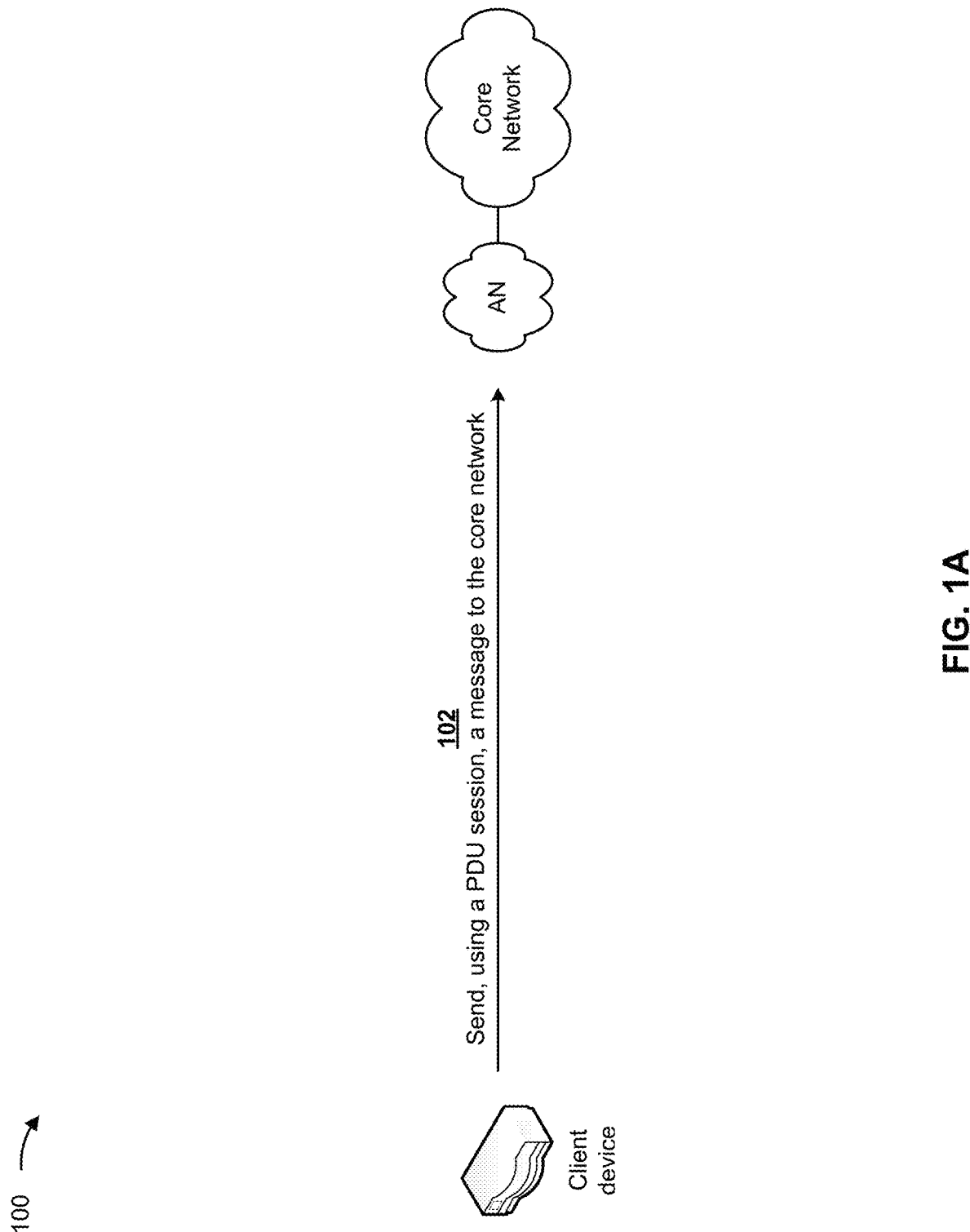

The following detailed description of example implementations refers to the accompanying drawings. The same reference numbers in different drawings may identify the same or similar elements.

In some cases, a client device may be connected to a core network on wireline access and may use multiple PDU sessions to communicate traffic with the core network. Traffic for each PDU session may be destined for different core network devices and may require different services (e.g., an aggregate maximum bitrate, a guaranteed bitrate, quality of service (QoS) shaping requirements, and/or the like). However, identifying different PDU sessions from a same client device may not be achievable by using a medium access control (MAC) address, an Internet protocol (IP) address, virtual local area networks (VLANs), and/or the like.

A current technique to handle different PDU sessions includes causing a data plane of the core network to utilize stateless point-to-point protocol over Ethernet (PPPoE) to transport data packets. In this technique, a session identifier is allocated to a data packet by the client device and a core network device blindly accepts the data packet based on the session identifier, which exposes the core network device to potential attacks (e.g., via spoofed data packets). Additionally, in some cases, the client device may not allocate a unique session identifier and/or a combination of a MAC address and the session may be insufficient to uniquely identify a PDU session, which could cause the data packet to be misrouted and/or lost by the core network. Furthermore, this technique requires expensive changes to an access network of the core network to allow proper routing of a data packet.

Thus, the current technique to handle data packets for different PDU sessions may waste computing resources (e.g., processing resources, memory resources, communication resources, and/or the like), networking resources, and/or the like associated with handling network attacks, handling misrouted or lost data packets, modifying an access network, and/or the like. Moreover, the current technique cannot handle layer 2 tunneling protocol (L2TP) traffic (e.g., that utilizes tunnels).

Some implementations described herein provide an access gateway function (AGF) that may receive a message (e.g., that includes a plurality of encapsulated packets, including an encapsulated data packet) from a client device. The AGF may process the message to determine identification information associated with the client device (e.g., a session identifier and/or a tunnel identifier included in a first encapsulated packet of the message) and to determine identification information associated with a PDU session, of one or more PDU sessions, of the client device (e.g., a PDU session identifier included in a second encapsulated packet of the message). The AGF may transmit, based on the identification information associated with the client device and the identification information associated with the PDU session of the client device, the message to another network device of the core network. For example, the AGF may identify, based on the identification information associated with the client device and the identification information associated with the PDU session of the client device, a tunnel between the AGF and the other network device (e.g., a tunnel configured to transmit traffic to and from the client device for the PDU session) and may transmit the message to the other network device via the tunnel.

In this way, the AGF supports multiple PDU sessions for 5G client devices on wireline access. The AGF can process existing message formats (e.g., Ethernet messages that include encapsulated PPPoE packets, encapsulated L2TP packets, encapsulated 5G data packets, and/or the like) to determine the identification information associated with the client device and the identification information associated with the PDU session, which means an access network of the core network does not need to be modified to implement the AGF as described herein. Furthermore, the AGF uses the identification information associated with the client device and the identification information associated with the PDU session to uniquely identify a tunnel and/or destination for the message, which prevents the message from being misrouted or lost by the core network. Additionally, the AGF determines the identification information associated with the client device and the identification information associated with the PDU session based on processing two different encapsulated packets of the message, therefore the AGF makes communications of PDU messages more secure (e.g., because spoofing multiple encapsulated packets of a message is harder than just one). This, in turn, conserves computing resources (e.g., processing resources, memory resources, communication resources, and/or the like), networking resources, and/or the like that would otherwise be wasted with modifying an access network handling misrouted or lost messages, handling network attacks, and/or the like.

FIGS. 1A-1L are diagrams of one or more example implementation(s) 100 described herein. As shown in FIG. 1A, a client device may be associated with a wireline access network (AN) and a core network. The client device may include a network device (e.g., a residential gateway, such as a 5G residential gateway), a mobile device (e.g., a user equipment), and/or the like that utilizes a transport protocol to carry messages via wireline access to the core network. The AN may include one or more radio transmitters. The core network may include an example architecture of a 5G next generation (NG) core network included in a 5G wireless telecommunications system, and may include physical elements, virtual elements, or a combination of physical and virtual elements.

As further shown in FIG. 1A and by reference number 102, the client device may send a message to the core network using a PDU session of one or more PDU sessions with the core network. In some implementations, the message may include a plurality of encapsulated packets. For example, the message may include an Ethernet packet that encapsulates a point-to-point protocol over Ethernet (PP-PoE) packet, wherein the PPPoE packet encapsulates a point-to-point protocol (PPP) packet and/or the PPP packet encapsulates a data packet, such as a 5G data packet, as further described herein in relation to FIG. 1K. As another example, the message may include an Ethernet packet that encapsulates an (Internet protocol) IP packet, wherein the IP packet encapsulates a user datagram protocol (UDP) packet; the UDP packet encapsulates a layer 2 tunneling protocol (L2TP) packet, such as an L2TPv2 packet; the L2TP packet encapsulates a PPP packet; and/or the PPP packet encapsulates a data packet, such as a 5G data packet, as further described herein in relation to FIG. 1L.

Figure 1B:
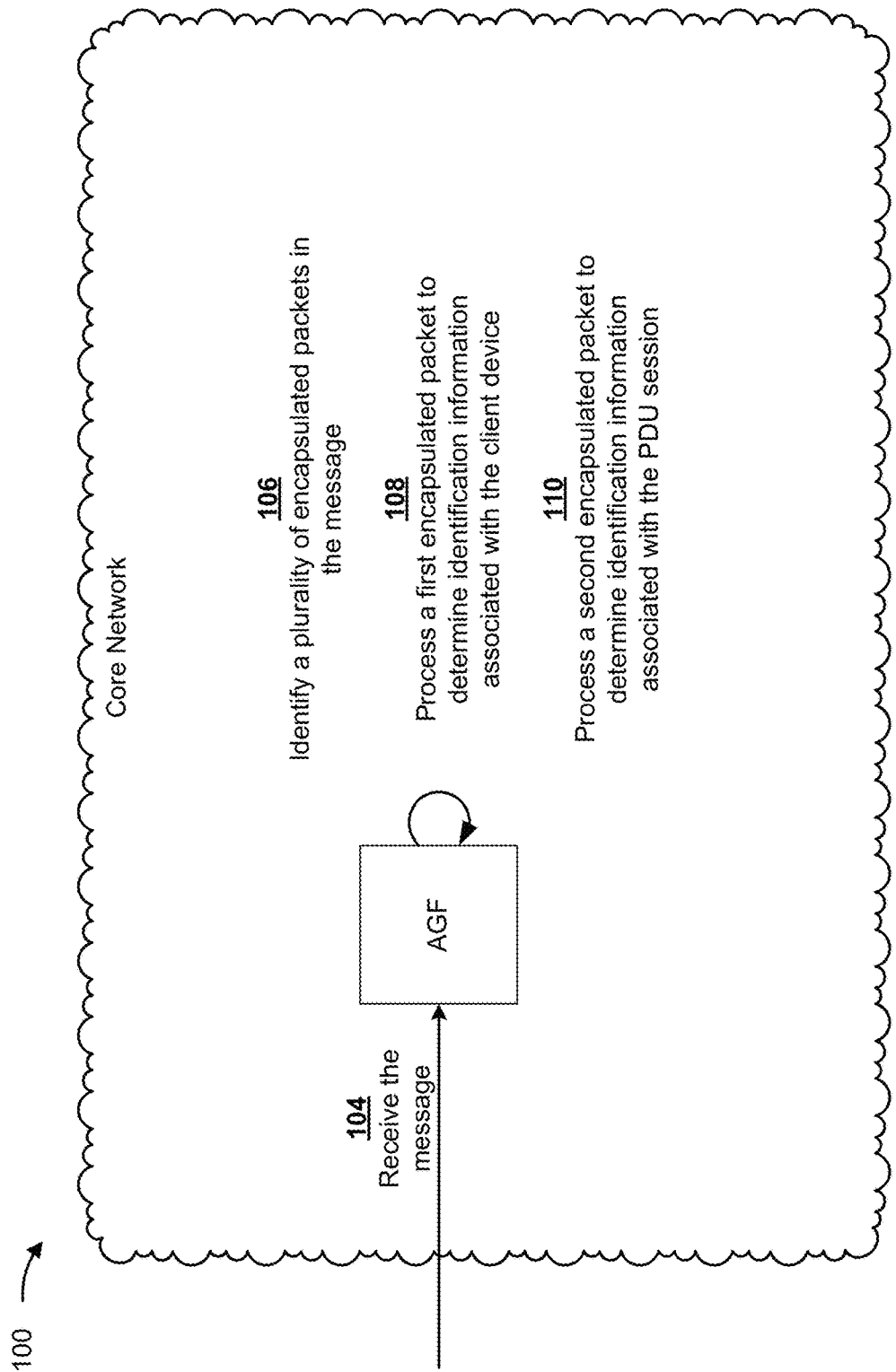

As shown in FIG. 1B, and by reference number 104, an access gateway function (AGF) of the core network may receive the message from the client device (e.g., via the AN). As shown by reference number 106, the AGF may identify the plurality of encapsulated packets in the message. For example, the AGF may parse the message to identify the plurality of encapsulated packets.

As shown by reference number 108, the AGF may process a first encapsulated packet to determine identification information associated with the client device. The identification information associated with the client device may indicate that the client device is an originating device of the message. In some implementations, when the message includes an encapsulated PPPoE packet, the AGF may process (e.g., parse) the PPPoE packet to determine a session identifier included in the PPPoE packet (e.g., in a "Session ID" field of the PPPoE packet as shown in FIG. 1K). The AGF may determine, based on the session identifier, the identification information associated with the client device. For example, the AGF may perform a lookup operation that involves scanning a data structure (e.g., a data structure that is included in the AGF or is accessible to the AGF) for an entry associated with the session identifier. The entry may include the identification information associated with the client device. Additionally, or alternatively, when the message includes an encapsulated L2TP packet, the AGF may process (e.g., parse) the L2TP packet to determine a tunnel identifier and a session identifier included in the L2TP packet (e.g., in a "Tunnel ID" field and a "Session ID" field of the L2TP packet as shown in FIG. 1L). The AGF may determine, based on the tunnel identifier and the session identifier, the identification information associated with the client device. For example, the AGF may perform a lookup operation that involves scanning a data structure (e.g., a data structure that is included in the AGF or is accessible to the AGF) for an entry associated with the tunnel identifier and the session identifier. The entry may include the identification information associated with the client device.

As shown by reference number 110, the AGF may process a second encapsulated packet to determine identification information associated with the PDU session. The identification information associated with the PDU session may indicate the PDU session the client device used to send the message. In some implementations, when the message includes a 5G data packet, the AGF may process (e.g., parse) the 5G packet to determine a PDU session identifier included in the 5G packet (e.g., in a "PDU Session ID" field of the 5G data packet as shown in FIGS. 1J-1L). The AGF may determine, based on the PDU session identifier, the identification information associated with the PDU. For example, the AGF may perform a lookup operation that involves scanning a data structure (e.g., a data structure that is included in the AGF or is accessible to the AGF) for an entry associated with the PDU session identifier. The entry may include the identification information associated with the PDU session.

Figure 1C:
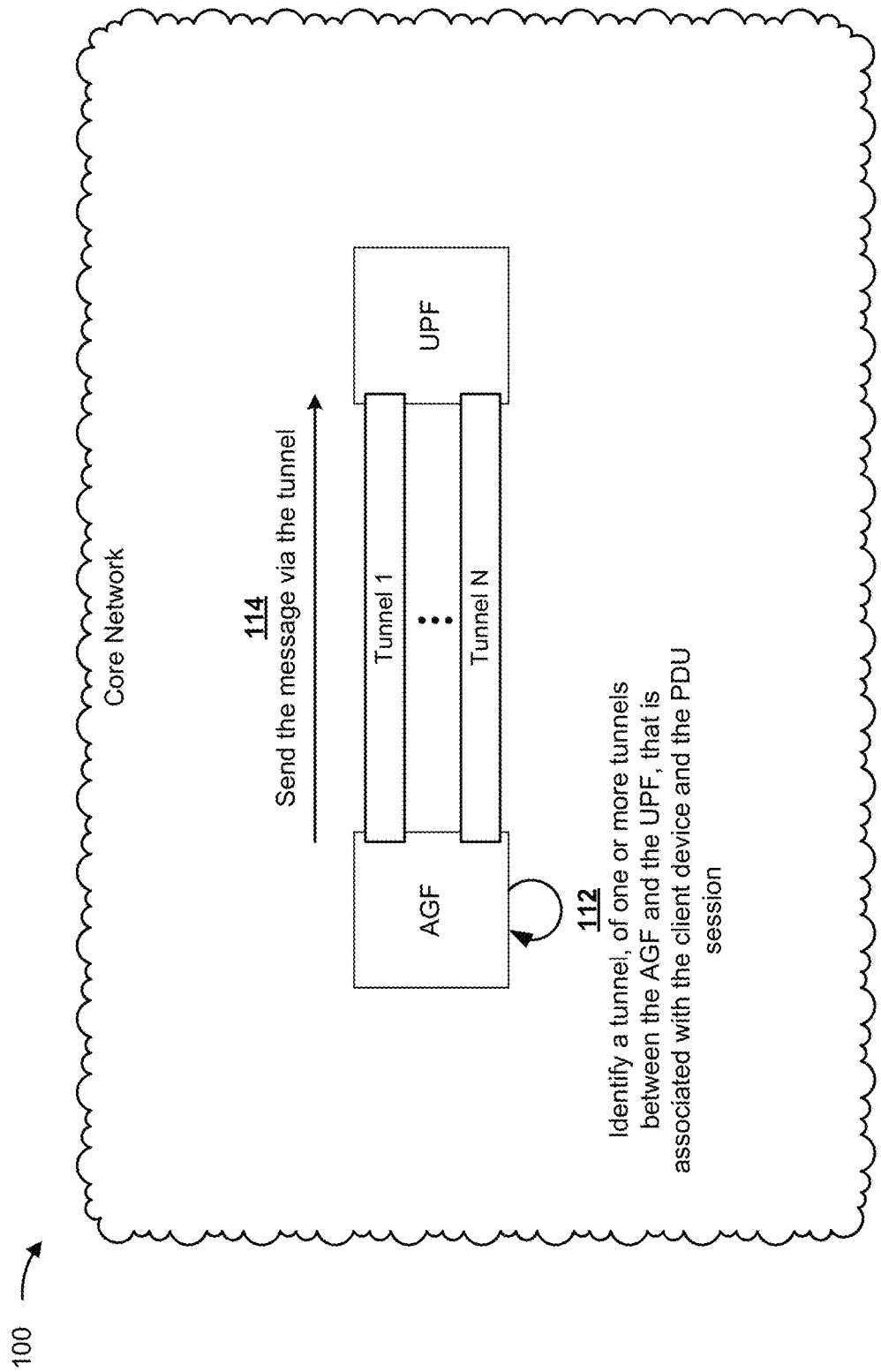

As shown in FIG. 1C and by reference number 112, the AGF may identify a tunnel, of one or more tunnels (shown in FIG. 1C as tunnels 1 through N, where N is greater than 1) between the AGF and another network device of the core network, such as a user plane function (UPF). The tunnel may be a general packet radio service (GPRS) tunneling protocol (GTP) tunnel. The tunnel may be configured to transmit traffic associated with the PDU session to and from the client device (e.g., within the core network). In some implementations, the AGF may locate, in a data structure (e.g., a data structure that is included in the AGF or is accessible to the AGF) and based on the identification information associated with the client device and the identification information associated with the PDU session, an entry associated with the tunnel. The entry may indicate that the tunnel is to transmit traffic to and/or from the client device for the PDU session. The AGF may process the entry to identify the tunnel. As shown by reference number 114, the AGF may send (e.g., transmit) the message via the tunnel to the UPF. Additionally, or alternatively, the AGF may send the message to the UPF without using a tunnel (e.g., when a tunnel has not been established between the AGF and the UPF, the message is not designated to be transferred via a tunnel, and/or the like).

Figure 1D:
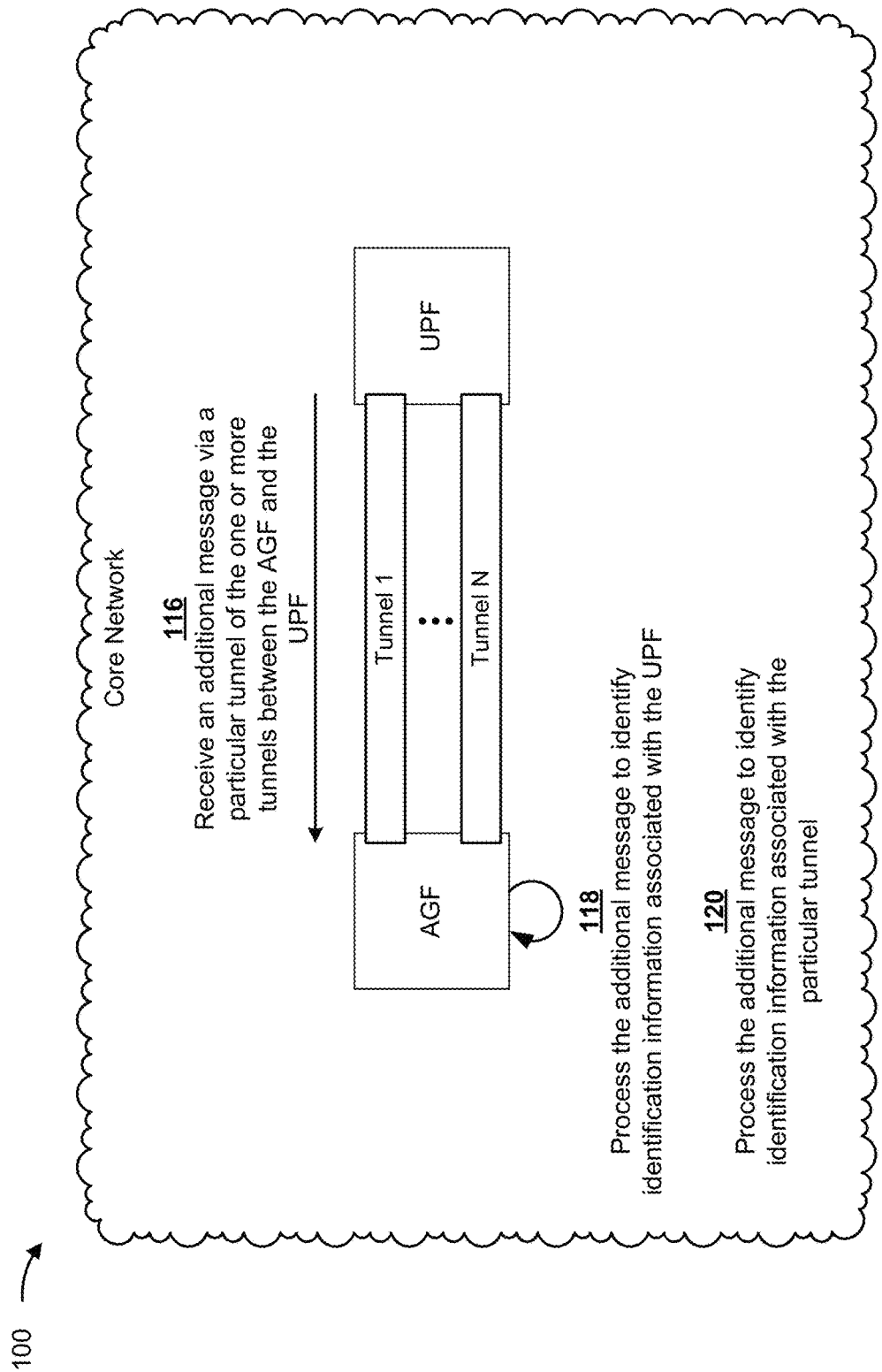

As shown in FIG. 1D and by reference number 116, the AGF may receive an additional message via a particular tunnel of the one or more tunnels between the AGF and the UPF. The particular tunnel may be the same tunnel that transmitted the message from the AGF to the UPF or a different tunnel of the one or more tunnels between the AGF and the UPF. The additional message may include a plurality of encapsulated packets and may have the same or a similar format as the message. For example, the additional message may include an Ethernet packet that encapsulates a PPPoE packet, wherein the PPPoE packet encapsulates a PPP packet and/or the PPP packet encapsulates a data packet, such as a 5G data packet, as further described herein in relation to FIG. 1K. As another example, the additional message may include an Ethernet packet that encapsulates an IP packet, wherein the IP packet encapsulates a UDP packet; the UDP packet encapsulates an L2TP packet, such as an L2TPv2 packet; the L2TP packet encapsulates a PPP packet; and/or the PPP packet encapsulates a data packet, such as a 5G data packet, as further described herein in relation to FIG. 1L.

As shown by reference number 118, the AGF may process the additional message to identify identification information associated with the UPF. The identification information associated with the UPF may indicate that the UPF is an originating device of the additional message. In some implementations, when the additional message includes an Ethernet packet, the AGF may process (e.g., parse) the Ethernet packet to determine a source address included in the Ethernet packet (e.g., in a source MAC address ("Src MAC") field of the Ethernet packet as shown in FIGS. 1K-1L). The AGF may determine, based on the source address, the identification information associated with the UPF. For example, the AGF may perform a lookup operation that involves scanning a data structure (e.g., a data structure that is included in the AGF or is accessible to the AGF) for an entry associated with the source address. The entry may include the identification information associated with the UPF.

As shown by reference number 120, the AGF may process the additional message to identify identification information associated with the particular tunnel. In some implementations, when the additional message includes an encapsulated L2TP packet, the AGF may process (e.g., parse) the encapsulated L2TP packet to determine a tunnel identifier included in the L2TP packet (e.g., in a "Tunnel ID" field of the L2TP packet as shown in FIG. 1L). The AGF may determine, based on the tunnel identifier, the identification information associated with the particular tunnel. For example, the AGF may perform a lookup operation that involves scanning a data structure (e.g., a data structure that is included in the AGF or is accessible to the AGF) for an entry associated with the tunnel identifier. The entry may include the identification information associated with the particular tunnel. Additionally, or alternatively, the AGF may monitor the one or more tunnels between the AGF and the UDP. When the AGF receives the additional message, the AGF may determine that that additional message was received via the particular tunnel and thereby determine the identification information associated with the particular tunnel.

Figure 1E:
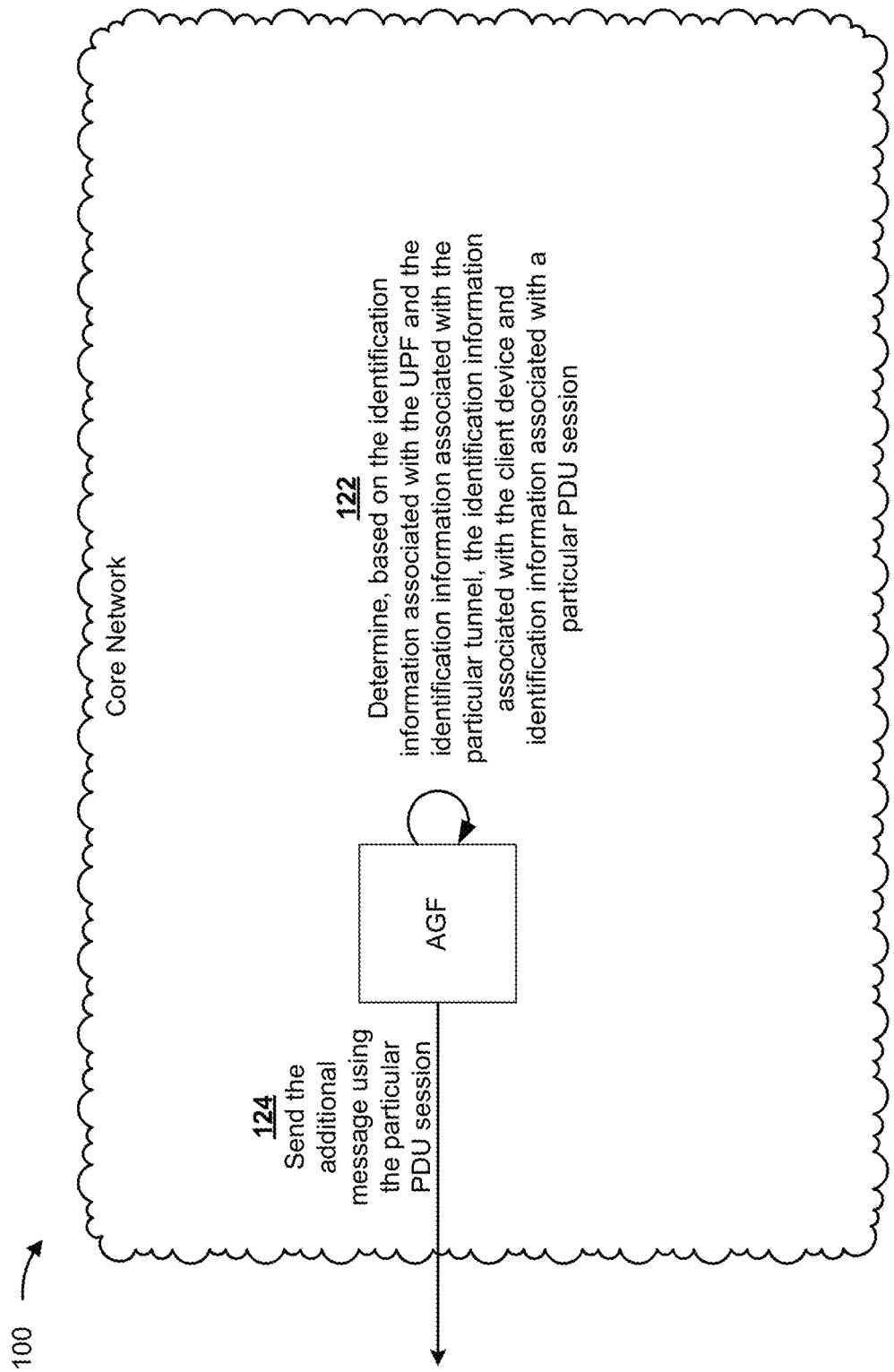

As shown in FIG. 1E and by reference number 122, the AGF may determine, the identification information associated with the client device and/or identification information associated with a particular PDU session (e.g., based on the identification information associated with the UPF and the identification information associated with the particular tunnel). The particular PDU session may be the same PDU session used by the client device to send the message to the core network or a different PDU session of the one or more PDU sessions that the client device has with the core network. For example, the AGF may perform a lookup operation that involves scanning a data structure (e.g., a data structure that is included in the AGF or is accessible to the AGF) for an entry associated with the identification information associated with the UPF and the identification information associated with the particular tunnel. The entry may include the identification information associated with the client device and the identification information associated with the particular PDU session. The AGF may process the identification information associated with the client device and the identification information associated with the particular PDU session to determine to send the additional message to the client device using the particular PDU session. As shown by reference number 124, the AGF may send the additional message (e.g., to the client device) using the particular PDU session.

Figure 1F:
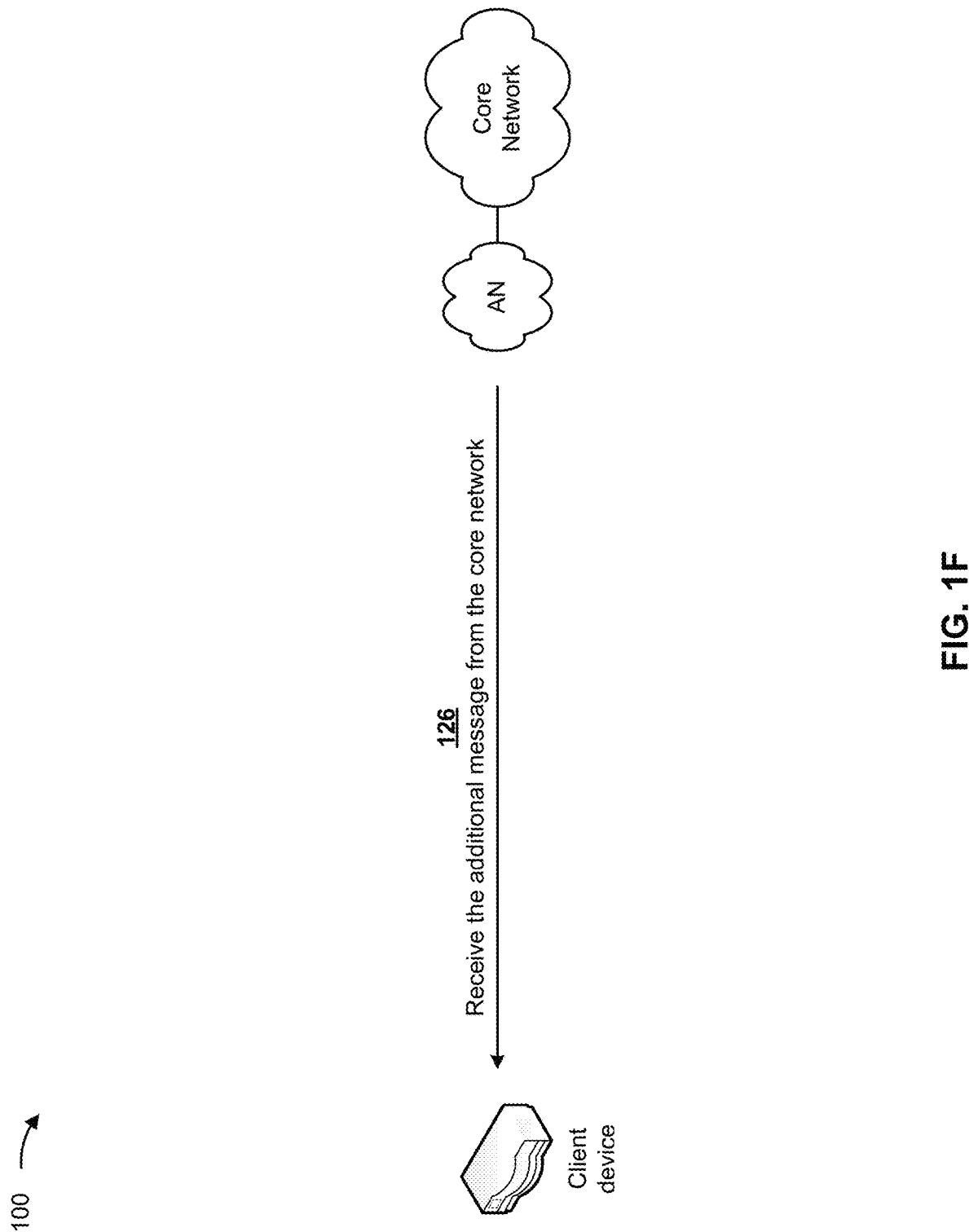

As shown in FIG. 1F and by reference number 126, the client device may receive the additional message from the core network (e.g. from the AGF via the AN). The client device may process the additional message to determine payload information associated with the additional message. For example, when the message includes an encapsulated 5G data packet, the client device may process (e.g., parse) the encapsulated 5G to determine payload information included in the 5G packet (e.g., in a "Payload" field of the 5G data packet as shown in FIG. 1J).

In this way, as shown in FIGS. 1A-1F, some implementations provide an AGF that supports multiple PDU sessions for a 5G client device on wireline access.

FIG. 1G shows types of information utilized by the PPPoE and the PPP in implementations described herein. As shown, the PPPoE may include bits associated with a PPP session stage, an offer (PADO), an initiation (PADI), a session grant (PADG), a session credit response (PADC), a quality (PADQ), a request (PADR), a session confirmation (PADS), a termination (PADT), a message (PADM), and a network (PADN).

As further shown FIG. 1G, the PPP may include bits associated with Internet protocol version 4 (IPv4), a bridging PDU, multi-link, Internet protocol version 6 (IPv6), 5G data, multi-protocol label switching (MPLS) unicast, MPLS multicast, a vendor-specific protocol (VSP), an Internet protocol control protocol, an IPv6 control protocol, a vendor-specific network control protocol (VSNCP), 5G access stratum, a link control protocol, a password authentication protocol, a vendor-specific authentication protocol (VSAP), a challenge handshake authentication protocol, and an extensible authentication protocol. In some implementations, the bits associated with 5G data may be newly provided in the PPP.

Figure 1H:
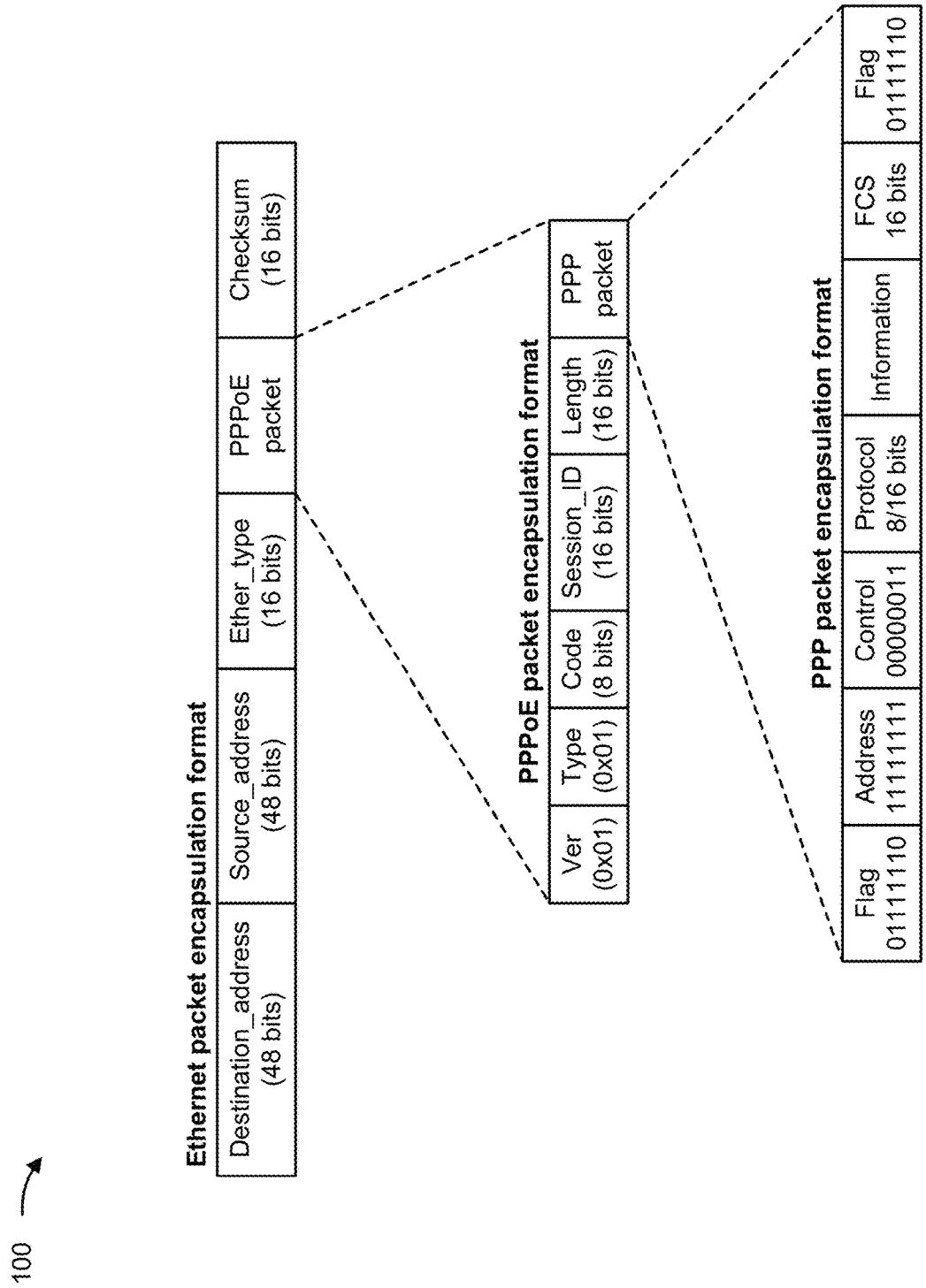

FIG. 1H shows information included in an Ethernet packet, a PPPoE packet of the Ethernet packet, and a PPP packet of the PPPoE packet that may be utilized in implementations described herein (e.g., in a message or an additional message described herein). For example, the Ethernet packet encapsulation format may include a destination address field, a source address field (e.g., as described herein), an Ethernet type field, a PPPoE packet field, and a checksum field. The PPPoE packet encapsulation format may include a version field, a type field, a code field, a session identifier field (e.g., as described herein), a length field, and a PPP packet field. The PPP packet encapsulation format may include a flag field, an address field, a control field, a protocol field, an information field, a frame check sequence (FCS) field, and another flag field.

Figure 1I:
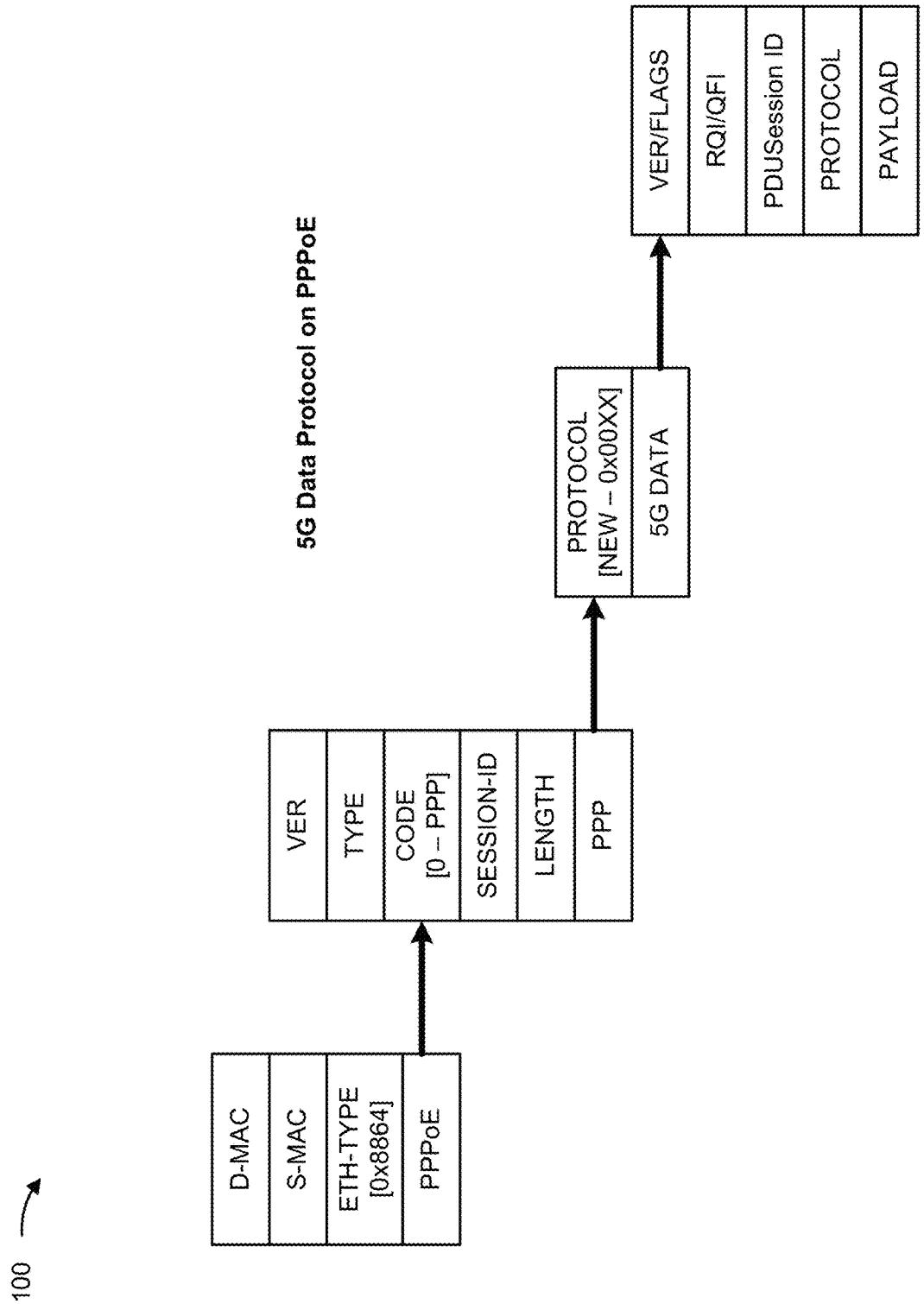
Figure 1K:
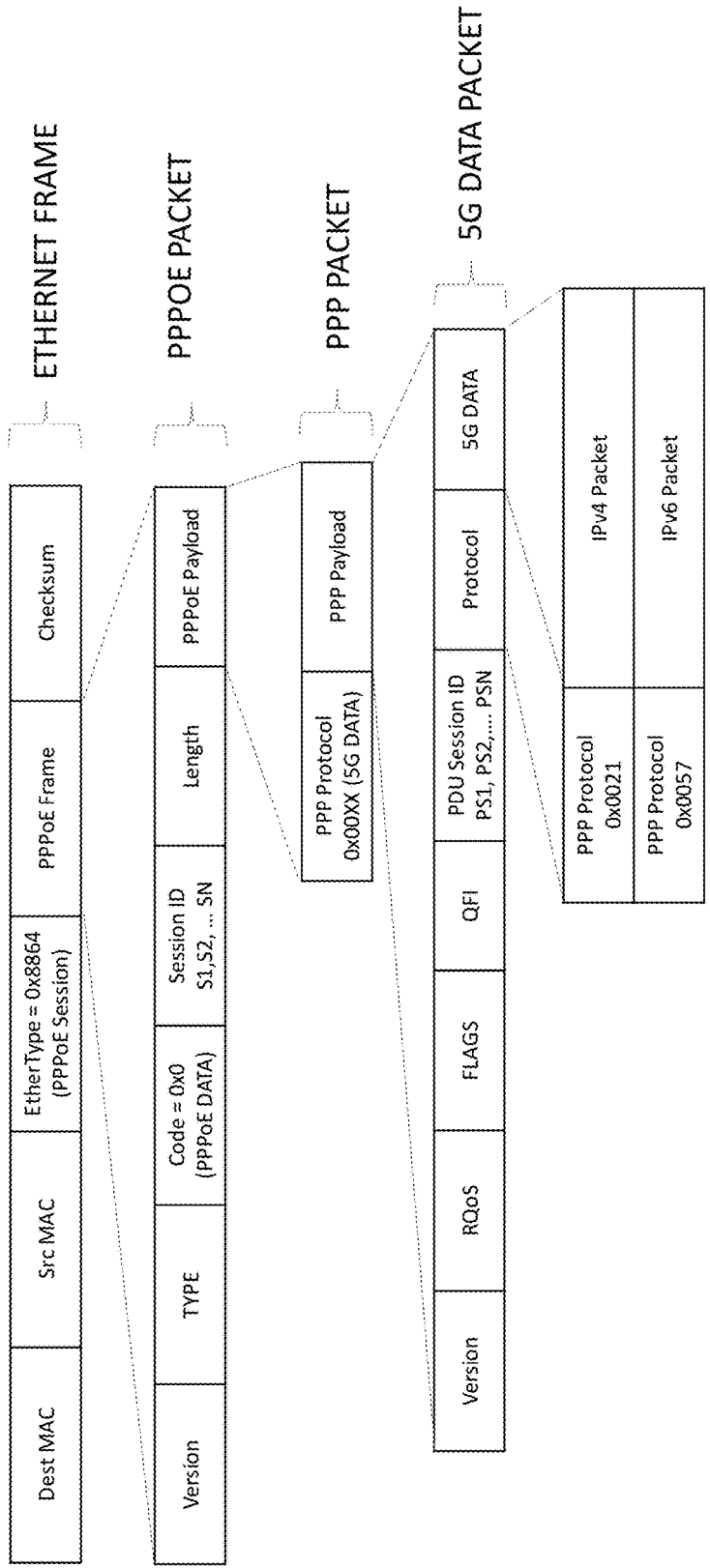
Figure 1L:
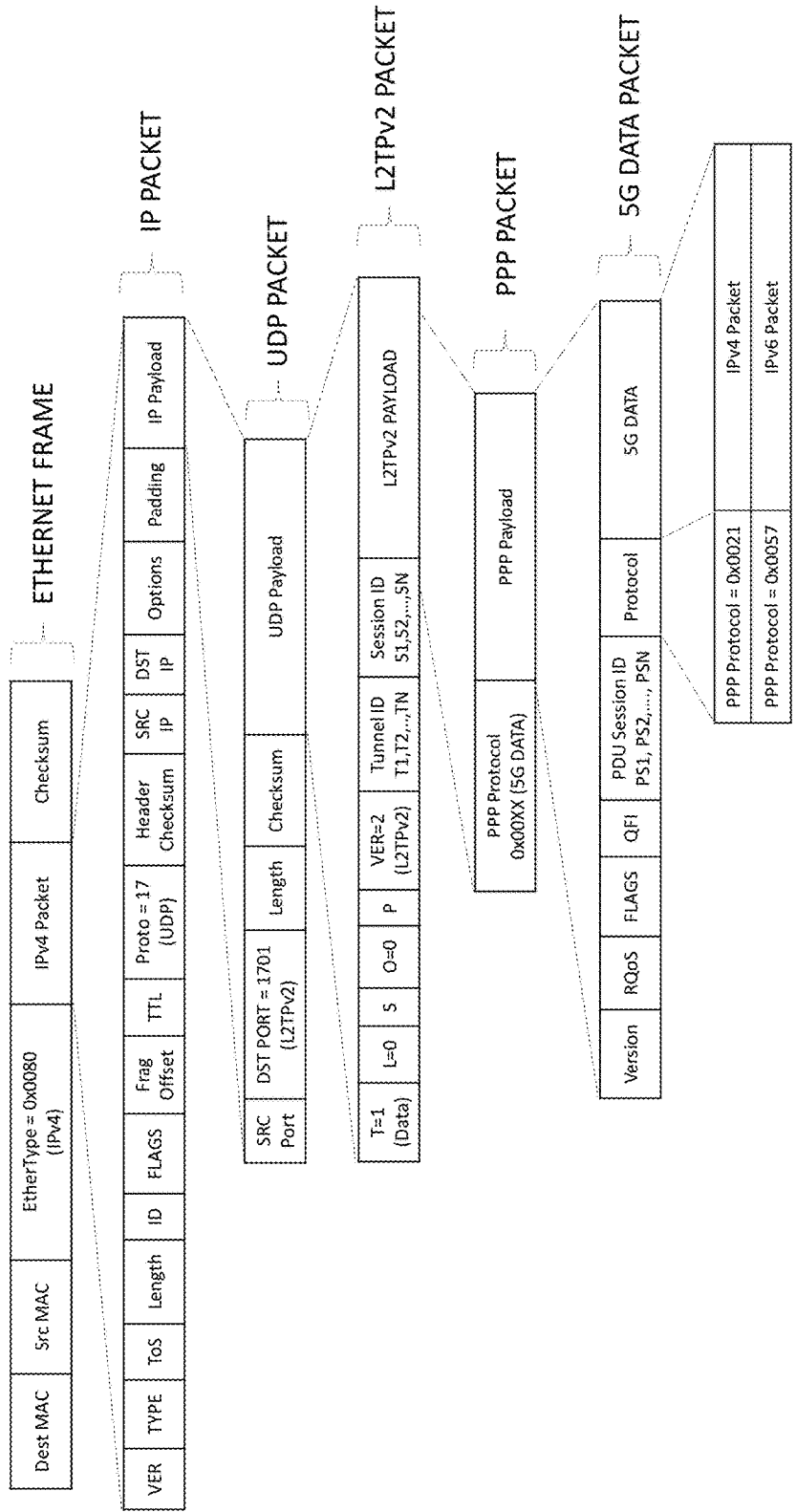

FIG. 1I depicts a packet associated with 5G data protocol on PPPoE that may be utilized in implementations described herein. As shown, a first portion of the packet may include a destination MAC address field, a source MAC address field, an Ethernet type field, and a PPPoE field that points to a second portion of the packet. The second portion of the packet may include a version field, a type field, a code field, a session identifier field (e.g. as described herein), a length field, and a PPP field that points to a third portion of the packet. The third portion of the packet may include a protocol field (e.g., that includes newly provided information "0x00XX") and a 5G data field that points to a fourth portion of the packet. The fourth portion of the packet may include a version/flags field, a reflective quality of service (QoS) indicator (RQI)/QoS flow identifier (QFI) field, a PDU Session identifier field (e.g., as described herein), a protocol field, and payload field.

FIG. 1J shows a message format for a 5G data packet, as utilized by the PPPoE, the PPP, the UDP, the L2TP, and/or the like in implementations described herein. As shown, the message format for the 5G data packet may include a version field, a reflective QoS field, a flags field, a QFI field, a PDU session ID [Octet 1], a PDU session ID [Octet 2], a PDU session ID [Octet 3], a PDU session ID [Octet 4], a PPP protocol[Octet 1] field, a PPP protocol[Octet 2] field, and a payload field.

FIG. 1K shows an example message with an encapsulated PPPoE packet. As shown in FIG. 1K, an Ethernet packet (e.g. an Ethernet frame) encapsulates a PPPoE packet, which encapsulates a PPP packet, which encapsulates a 5G data packet. As shown, the Ethernet packet may include a destination MAC address field, a source MAC address field, an Ethernet type field, a PPPoE frame field that includes the PPPoE packet, and a checksum field. The PPPoE packet may include a version field, a type field, a code field, a session identifier field (e.g. as described herein), a length field, and a PPP payload field that includes the PPP packet. The PPP packet may include a PPP protocol field (e.g., that includes 5G data "0x00XX") and a PPP payload field that includes the 5G data packet. The 5G data packet may include a version field, a reflective QoS field, a flags field, a QFI field, a PDU session identifier field (e.g., as described herein), a protocol field (e.g., indicating a particular PPP protocol), and a 5G data (e.g., a 5G payload) field that includes an IPv4 or an IPv6 packet.

FIG. 1L shows an example message with an encapsulated L2TPv2 packet. As shown in FIG. 1L, an Ethernet packet (e.g., an Ethernet frame) encapsulates an IP packet, which encapsulates a UDP packet, which encapsulates an L2TPv2 packet, which encapsulates a PPP packet, which encapsulates a 5G data packet. As shown, the Ethernet packet may include a destination MAC address field, a source MAC address field, an Ethernet type field, an IPv4 packet field that includes the IP packet, and a checksum field. The IP packet may include a version field, a type field, a type of service field, a length field, an identification field, a flags field, a fragmentation offset field, a time to live field, a protocol field (e.g., indicating a UDP), a header checksum field, a source IP address, a destination IP address, an options field, a padding field, and an IP payload field that includes the UDP packet. The UDP packet may include a source port field, a destination port field (e.g., indicating a port associated with L2TPv2), a length field, a checksum field, and a UDP payload field that includes the L2TPv2 packet.

The L2TPv2 packet may include a message type (T-bit) field (e.g., indicating that the L2TPv2 packet is a data packet), a length field is present (L-bit) field (e.g., indicating that a length field is not present in the L2TPv2 packet), an offset present (o-bit) field (e.g., indicating that an offset size field is not present in the L2TPv2 packet), a priority (p-bit) field (e.g., indicating whether the L2TPv2 packet is to have preferential treatment in queueing and transmission), a version field (e.g., indicating the second version of the L2TP), a tunnel identifier field (e.g., as described herein), a session identifier field (e.g., as described herein), and an L2TPv2 payload field that includes the PPP packet. The PPP packet may include a PPP protocol field (e.g., that includes 5G data "0x00XX") and a PPP payload field that includes the 5G data packet. The 5G data packet may include a version field, a reflective QoS field, a flags field, a QFI field, a PDU session identifier field (e.g., as described herein), a protocol field (e.g., indicating a particular PPP protocol), and a 5G data (e.g., a 5G payload) field that includes an IPv4 or an IPv6 packet.

As indicated above, FIGS. 1A-1L are provided as one or more examples. Other examples may differ from what is described with regard to FIGS. 1A-1L. The number and arrangement of devices shown in FIGS. 1A-1L are provided as one or more examples. In practice, there may be additional devices, fewer devices, different devices, or differently arranged than those shown in FIGS. 1A-1L. Furthermore, two or more devices shown in FIGS. 1A-1L may be implemented within a single device, or a single device shown in FIGS. 1A-1L may be implemented as multiple, distributed devices. Additionally, or alternatively, a set of devices (e.g., one or more devices) shown in FIGS. 1A-1L may perform one or more functions described as being performed by another set of devices shown in FIGS. 1A-1L.

Figure 2:
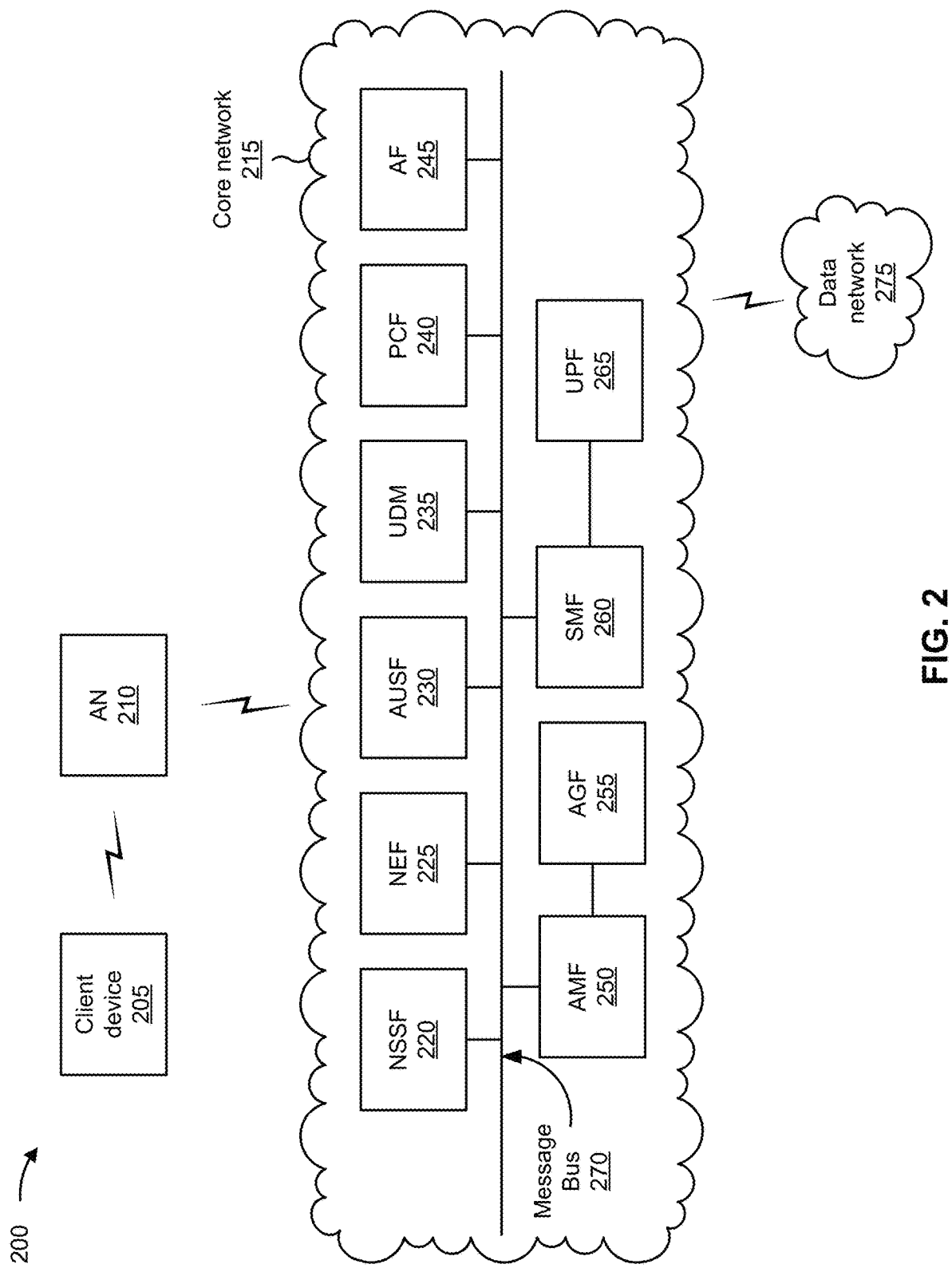
FIG. 2 is a diagram of an example environment in which systems and/or methods described herein may be implemented.

FIG. 2 is a diagram of an example environment 200 in which systems and/or methods described herein may be implemented. As shown in FIG. 2, example environment 200 may include client device 205, AN 210, core network 215, and a data network 275. Devices and/or networks of example environment 200 may interconnect via wired connections, wireless connections, or a combination of wired and wireless connections.

Client device 205 includes one or more devices capable of receiving, generating, storing, processing, and/or providing information, such as information described herein. For example, client device 205 may include a residential gateway (e.g., a 5G residential gateway), a user equipment, a network device (e.g., a label switching router (LSR), a label edge router (LER), an ingress router, an egress router, a provider router, a virtual router, a gateway, a switch, a firewall, a hub, a bridge, a reverse proxy, a proxy server, a cloud server, a data center server, a load balancer, and/or the like), or a similar type of device. In some implementations, client device 205 may receive network traffic from and/or may provide network traffic to core network 215, via AN 210.

AN 210 may include one or more nodes that are associated with a wireline connection to core network 215. AN 210 may include a central unit (CU) that includes a next generation (NG) interface connecting the CU to a core unit (e.g., a next gen core (NGC) unit), which may be a node of core network 215. AN 210 may transfer traffic between client device 205 and core network 215. In some implementations, AN 210 may perform scheduling and/or resource management for client device 205 covered by AN 210. In some implementations, AN 210 may be controlled or coordinated by a network controller, which may perform load balancing, network-level configuration, and/or the like. The network controller may communicate with AN 210 via a wireless or wireline backhaul. In some implementations, AN 210 may include a network controller, a self-organizing network (SON) module or component, or a similar module or component. In other words, AN 210 may perform network control, scheduling, and/or network management functions (e.g., for uplink, downlink, and/or sidelink communications of client device 205 covered by AN 210).

In some implementations, core network 215 may include an example functional architecture in which systems and/or methods described herein may be implemented. For example, core network 215 may include an example architecture of a fifth generation (5G) next generation (NG) core network included in a 5G wireless telecommunications system. While the example architecture of core network 215 shown in FIG. 2 may be an example of a service-based architecture, in some implementations, core network 215 may be implemented as a reference-point architecture.

As shown in FIG. 2, core network 215 may include a number of functional elements. The functional elements may include, for example, a network slice selection function (NSSF) 220, a network exposure function (NEF) 225, an authentication server function (AUSF) 230, a unified data management (UDM) component 235, a policy control function (PCF) 240, an application function (AF) 245, an access and mobility management function (AMF) 250, an access gateway function (AGF) 255, a session management function (SMF) 260, a user plane function (UPF) 265, and/or the like. These functional elements may be communicatively connected via a message bus 270. Each of the functional elements shown in FIG. 2 is implemented on one or more devices associated with a wireless telecommunications system. In some implementations, one or more of the functional elements may be implemented on physical devices, such as an access point, a base station, a gateway, and/or the like. In some implementations, one or more of the functional elements may be implemented on a computing device of a cloud computing environment.

NSSF 220 includes one or more devices that select network slice instances for client device 205. By providing network slicing, NSSF 220 allows an operator to deploy multiple substantially independent end-to-end networks potentially with the same infrastructure. In some implementations, each slice may be customized for different services.

NEF 225 includes one or more devices that support exposure of capabilities and/or events in the wireless telecommunications system to help other entities in the wireless telecommunications system discover network services.

AUSF 230 includes one or more devices that act as an authentication server and support the process of authenticating client device 205 in the wireless telecommunications system.

UDM 235 includes one or more devices that store user data and profiles in the wireless telecommunications system. UDM 235 may be used for fixed access, mobile access, and/or the like, in core network 215.

PCF 240 includes one or more devices that provide a policy framework that incorporates network slicing, roaming, packet processing, mobility management, and/or the like.

AF 245 includes one or more devices that support application influence on traffic routing, access to NEF 225, policy control, and/or the like.

AMF 250 includes one or more devices that act as a termination point for non-access stratum (NAS) signaling, mobility management, and/or the like.

AGF 255 includes one or more devices, between a wireline access infrastructure (e.g., AN 210) and wireless core network 215, that support residential gateways (e.g., client device 205) that include 5G NAS signaling and residential gateways that are purely wireline.

SMF 260 includes one or more devices that support the establishment, modification, and release of communications sessions in the wireless telecommunications system. For example, SMF 260 may configure traffic steering policies at UPF 265, enforce user equipment IP address allocation and policies, and/or the like.

UPF 265 includes one or more devices that serve as an anchor point for intraRAT and/or interRAT mobility. UPF 265 may apply rules to packets, such as rules pertaining to packet routing, traffic reporting, handling user plane QoS, and/or the like.

Message bus 270 represents a communication structure for communication among the functional elements. In other words, message bus 270 may permit communication between two or more functional elements.

Data network 275 includes one or more wired and/or wireless data networks. For example, data network 275 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of example environment 200 may perform one or more functions described as being performed by another set of devices of example environment 200.

Figure 3:
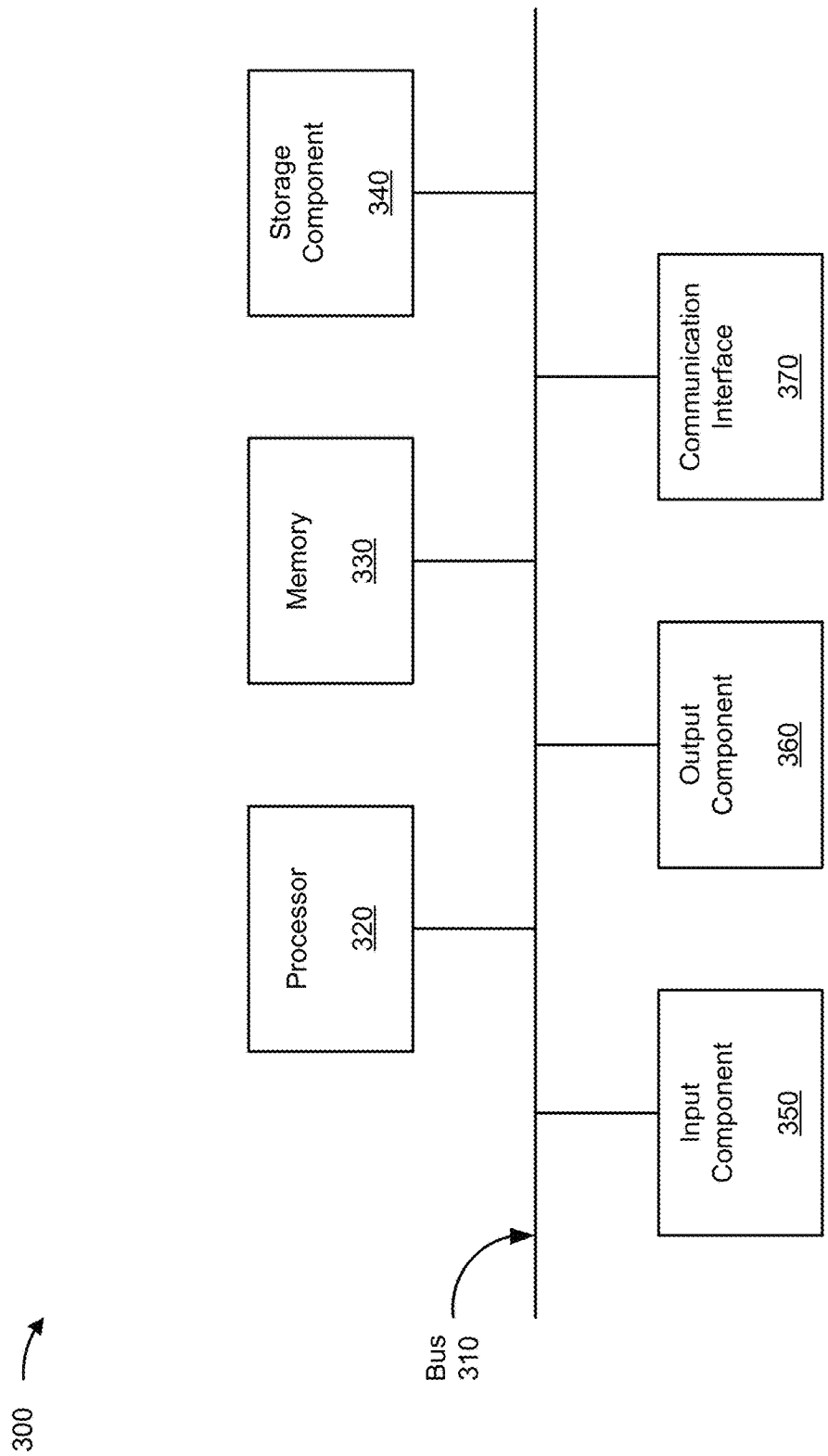
FIGS. 3 and 4 are diagrams of example components of one or more devices of FIG. 2.

FIG. 3 is a diagram of example components of a device 300. Device 300 may correspond to client device 205, NSSF 220, NEF 225, AUSF 230, UDM 235, PCF 240, AF 245, AMF 250, AGF 255, SMF 260, and/or UPF 265. In some implementations, client device 205, NSSF 220, NEF 225, AUSF 230, UDM 235, PCF 240, AF 245, AMF 250, AGF 255, SMF 260, and/or UPF 265 may include one or more devices 300 and/or one or more components of device 300. As shown in FIG. 3, device 300 may include a bus 310, a processor 320, a memory 330, a storage component 340, an input component 350, an output component 360, and a communication interface 370.

Figure 4:
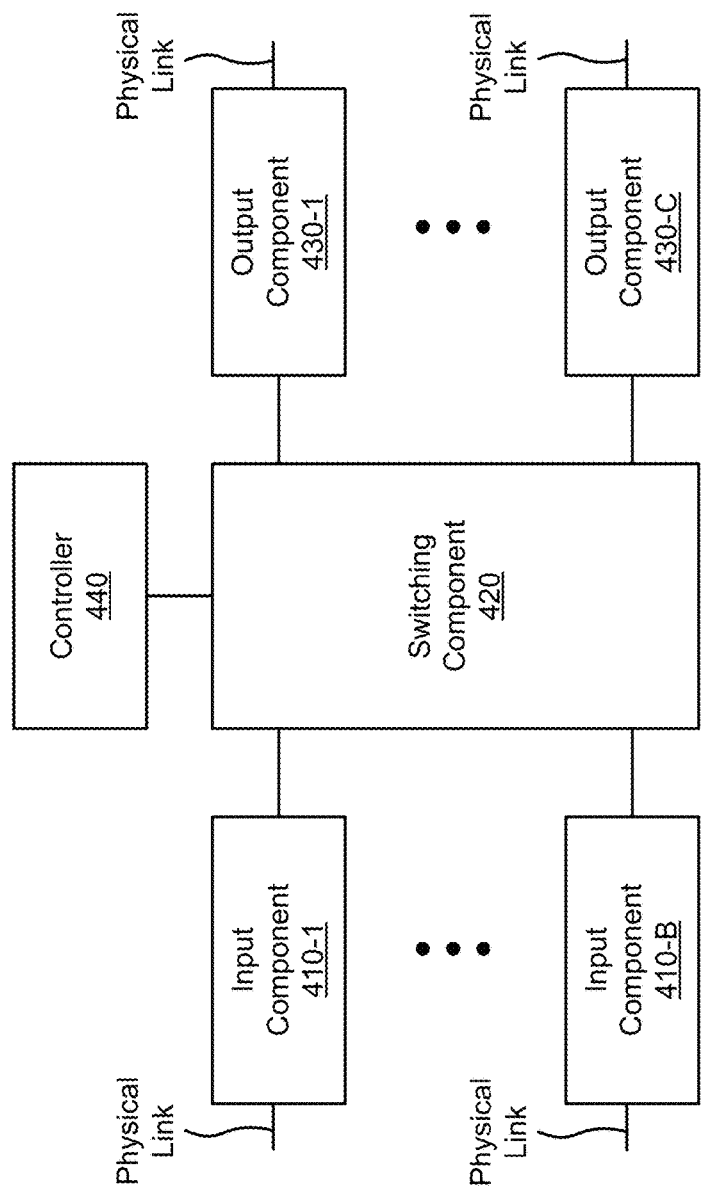

FIG. 4 is a diagram of example components of a device 400. Device 400 may correspond to client device 205, NSSF 220, NEF 225, AUSF 230, UDM 235, PCF 240, AF 245, AMF 250, AGF 255, SMF 260, and/or UPF 265. In some implementations, client device 205, NSSF 220, NEF 225, AUSF 230, UDM 235, PCF 240, AF 245, AMF 250, AGF 255, SMF 260, and/or UPF 265 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
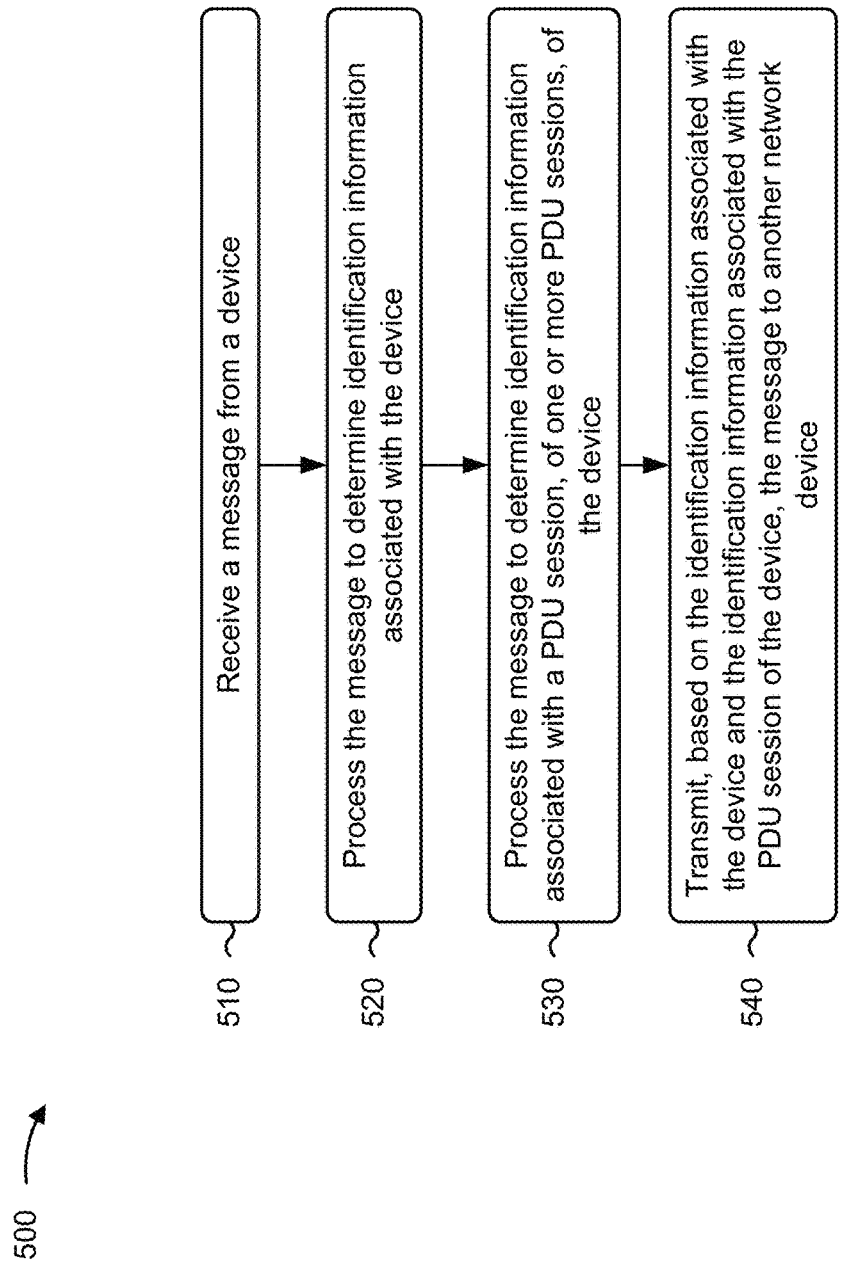
FIGS. 5-7 are flow charts of example processes relating to supporting multiple PDU sessions for 5G client devices on wireline access.

FIG. 5 is a flow chart of an example process 500 for supporting multiple PDU sessions for 5G client devices on wireline access. In some implementations, one or more process blocks of FIG. 5 may be performed by a network device (e.g., AGF 255) of a core network (e.g., core network 215). In some implementations, one or more process blocks of FIG. 5 may be performed by another device or a group of devices separate from or including the network device, such as one or more other network devices of the core network.

As shown in FIG. 5, process 500 may include receiving a message from a device (block 510). For example, the network device (e.g., using processor 320, memory 330, storage component 340, input component 350, output component 360, communication interface 370, input component 410, switching component 420, output component 430, controller 440, and/or the like) may receive a message from a device, as described above.

As further shown in FIG. 5, process 500 may include processing the message to determine identification information associated with the device (block 520). For example, the network device (e.g., using processor 320, memory 330, storage component 340, input component 350, output component 360, communication interface 370, input component 410, switching component 420, output component 430, controller 440, and/or the like) may process the message to determine identification information associated with the device, as described above.

As further shown in FIG. 5, process 500 may include processing the message to determine identification information associated with a packet data unit (PDU) session, of one or more PDU sessions, of the device (block 530). For example, the network device (e.g., using processor 320, memory 330, storage component 340, input component 350, output component 360, communication interface 370, input component 410, switching component 420, output component 430, controller 440, and/or the like) may process the message to determine identification information associated with a PDU session, of one or more PDU sessions, of the device, as described above.

As further shown in FIG. 5, process 500 may include transmitting, based on the identification information associated with the device and the identification information associated with the PDU session of the device, the message to another network device (block 540). For example, the network device (e.g., using processor 320, memory 330, storage component 340, input component 350, output component 360, communication interface 370, input component 410, switching component 420, output component 430, controller 440, and/or the like) may transmit, based on the identification information associated with the device and the identification information associated with the PDU session of the device, the message to another network device, as described above.

Process 500 may include additional implementations, such as any single implementation or any combination of implementations described below and/or in connection with one or more other processes described elsewhere herein.

In a first implementation, the message includes an Ethernet packet, wherein the Ethernet packet encapsulates a point-to-point protocol over Ethernet (PPPoE) packet, the PPPoE packet encapsulates a point-to-point protocol (PPP) packet, and the PPP packet encapsulates a 5G data packet.

In a second implementation, alone or in combination with the first implementation, processing the message to determine the identification information associated with the device comprises: processing the PPPoE packet to identify a session identifier included in the PPPoE packet, and determining, based on the session identifier, the identification information associated with the device.

In a third implementation, alone or in combination with one or more of the first and second implementations, processing the message to determine the identification information associated with the PDU session of the device comprises processing the 5G data packet to identify a PDU session identifier included in the 5G data packet, and determining, based on the PDU session identifier, the identification information associated with the PDU session of the device.

In a fourth implementation, alone or in combination with one or more of the first through third implementations, the message includes an Ethernet packet, wherein the Ethernet packet encapsulates an (Internet protocol) IP packet, the IP packet encapsulates a user datagram protocol (UDP) packet, the UDP packet encapsulates a layer 2 tunneling protocol (L2TP) packet, the L2TP packet encapsulates a point-to-point protocol (PPP) packet, and the PPP packet encapsulates a 5G data packet.

In a fifth implementation, alone or in combination with one or more of the first through fourth implementations, processing the message to determine the identification information associated with the device comprises processing the L2TP packet to identify a tunnel identifier and a session identifier included in the L2TP packet, and determining, based on the tunnel identifier and the session identifier, the identification information associated with the device.

In a sixth implementation, alone or in combination with one or more of the first through fifth implementations, processing the message to determine the identification information associated with the PDU session of the device comprises processing the 5G data packet to identify a PDU session identifier included in the 5G data packet, and determining, based on the PDU session identifier, the identification information associated with the PDU session of the device.

In a seventh implementation, alone or in combination with one or more of the first through sixth implementations, transmitting, based on the identification information associated with the device and identification information associated with the PDU session of the device, the message to the other network device comprises identifying, based on the identification information associated with the network device and identification information associated with the PDU session of the device, a tunnel between the network device and the other network device, and transmitting, via the tunnel, the message to the other network device.

In an eighth implementation, alone or in combination with one or more of the first through seventh implementations, process 500 includes receiving, via a tunnel between the network device and the other network device, an additional message from the other network device; processing the additional message to identify identification information associated with the other network device; processing the additional message to identify identification information associated with the tunnel; and transmitting, based on the identification information associated with the other network device and the identification information associated with the tunnel, the additional message to the device.

In a ninth implementation, alone or in combination with one or more of the first through eighth implementations, process 500 includes receiving, via a tunnel between the network device and the other network device, an additional message from the other network device; processing the additional message to identify identification information associated with the other network device; processing the additional message to identify identification information associated with the tunnel; determining, based on the identification information associated with the other network device and the identification information associated with the tunnel, the identification information associated with the device and the identification information associated with the PDU session of the device; and transmitting, based on the identification information associated with the device and the identification information associated with the PDU session of the device, the additional message to the device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
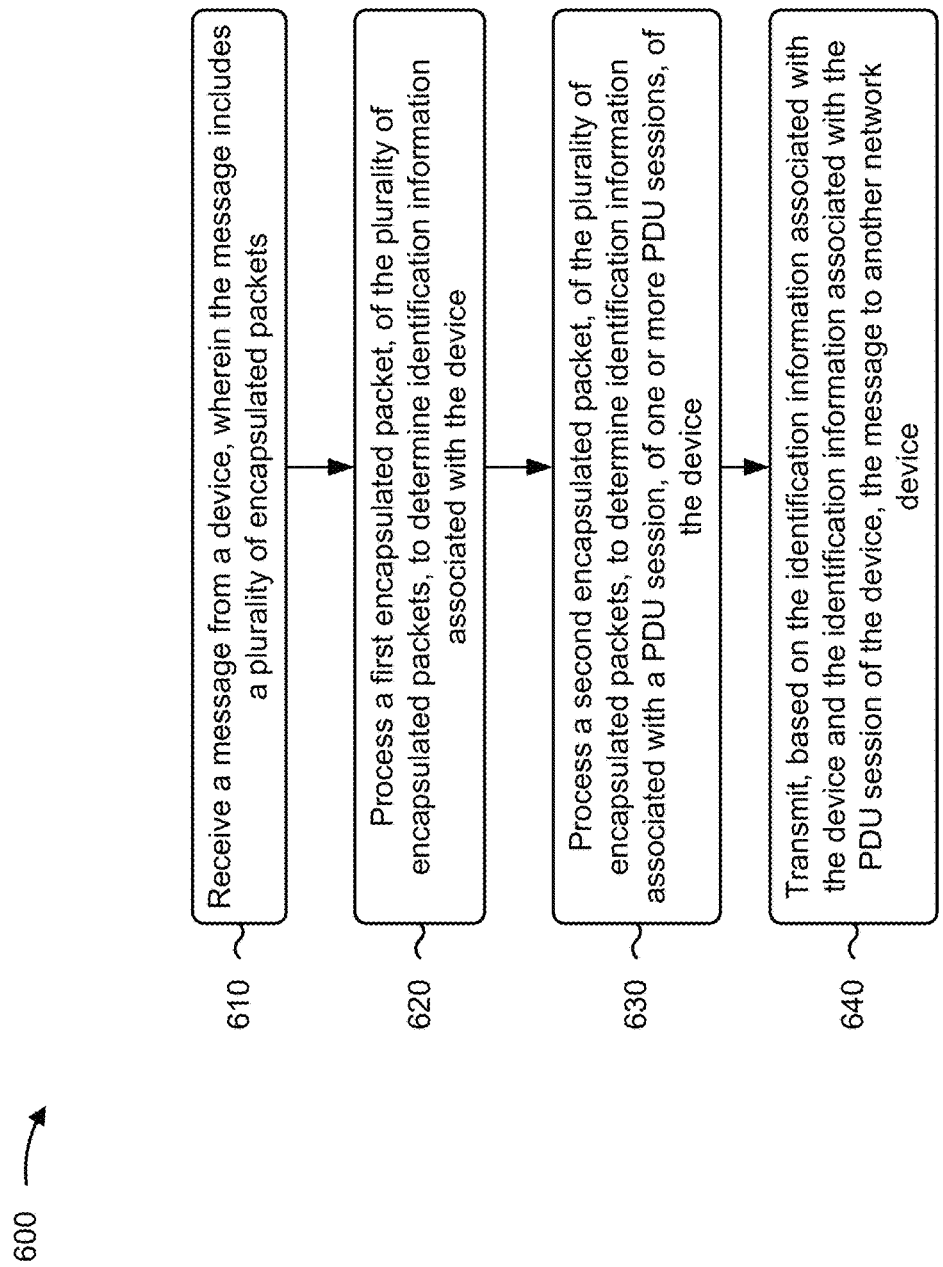

FIG. 6 is a flow chart of an example process 600 for supporting multiple PDU sessions for 5G client devices on wireline access. In some implementations, one or more process blocks of FIG. 6 may be performed by a network device (e.g., AGF 255) of a core network (e.g., core network 215). In some implementations, one or more process blocks of FIG. 5 may be performed by another device or a group of devices separate from or including the network device, such as one or more other network devices of the core network.

As shown in FIG. 6, process 600 may include receiving a message from a device, wherein the message includes a plurality of encapsulated packets (block 610). For example, the network device (e.g., using processor 320, memory 330, storage component 340, input component 350, output component 360, communication interface 370, input component 410, switching component 420, output component 430, controller 440, and/or the like) may receive a message from a device, as described above. In some implementations, the message includes a plurality of encapsulated packets.

As further shown in FIG. 6, process 600 may include processing a first encapsulated packet, of the plurality of encapsulated packets, to determine identification information associated with the device (block 620). For example, the network device (e.g., using processor 320, memory 330, storage component 340, input component 350, output component 360, communication interface 370, input component 410, switching component 420, output component 430, controller 440, and/or the like) may process a first encapsulated packet, of the plurality of encapsulated packets, to determine identification information associated with the device, as described above.

As further shown in FIG. 6, process 600 may include processing a second encapsulated packet, of the plurality of encapsulated packets, to determine identification information associated with a PDU session, of one or more PDU sessions, of the device (block 630). For example, the network device (e.g., using processor 320, memory 330, storage component 340, input component 350, output component 360, communication interface 370, input component 410, switching component 420, output component 430, controller 440, and/or the like) may process a second encapsulated packet, of the plurality of encapsulated packets, to determine identification information associated with a PDU session, of one or more PDU sessions, of the device, as described above.

As further shown in FIG. 6, process 600 may include transmitting, based on the identification information associated with the device and the identification information associated with the PDU session of the device, the message to another network device (block 640). For example, the network device (e.g., using processor 320, memory 330, storage component 340, input component 350, output component 360, communication interface 370, input component 410, switching component 420, output component 430, controller 440, and/or the like) may transmit, based on the identification information associated with the device and the identification information associated with the PDU session of the device, the message to another network device, as described above.

Process 600 may include additional implementations, such as any single implementation or any combination of implementations described below and/or in connection with one or more other processes described elsewhere herein.

In a first implementation, processing the first encapsulated packet to determine the identification information associated with the device comprises processing the first encapsulated packet to identify a session identifier included in the first encapsulated packet, and determining, based on the session identifier, the identification information associated with the device.

In a second implementation, alone or in combination with the first implementation, processing the second encapsulated packet to determine the identification information associated with the PDU session of the device includes processing the second encapsulated packet to identify a PDU session identifier included in the second encapsulated packet, and determining, based on the PDU session identifier, the identification information associated with the PDU session of the device.

In a third implementation, alone or in combination with one or more of the first and second implementations, the first encapsulated packet is a point-to-point protocol over Ethernet (PPPoE) packet and the second encapsulated packet is a 5G data packet.

In a fourth implementation, alone or in combination with one or more of the first through third implementations, the first encapsulated packet is a layer 2 tunneling protocol (L2TP) packet and the second encapsulated packet is a 5G data packet.

In a fifth implementation, alone or in combination with one or more of the first through fourth implementations, the network device is an access gateway function associated with a 5G network and the device is a 5G residential gateway.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
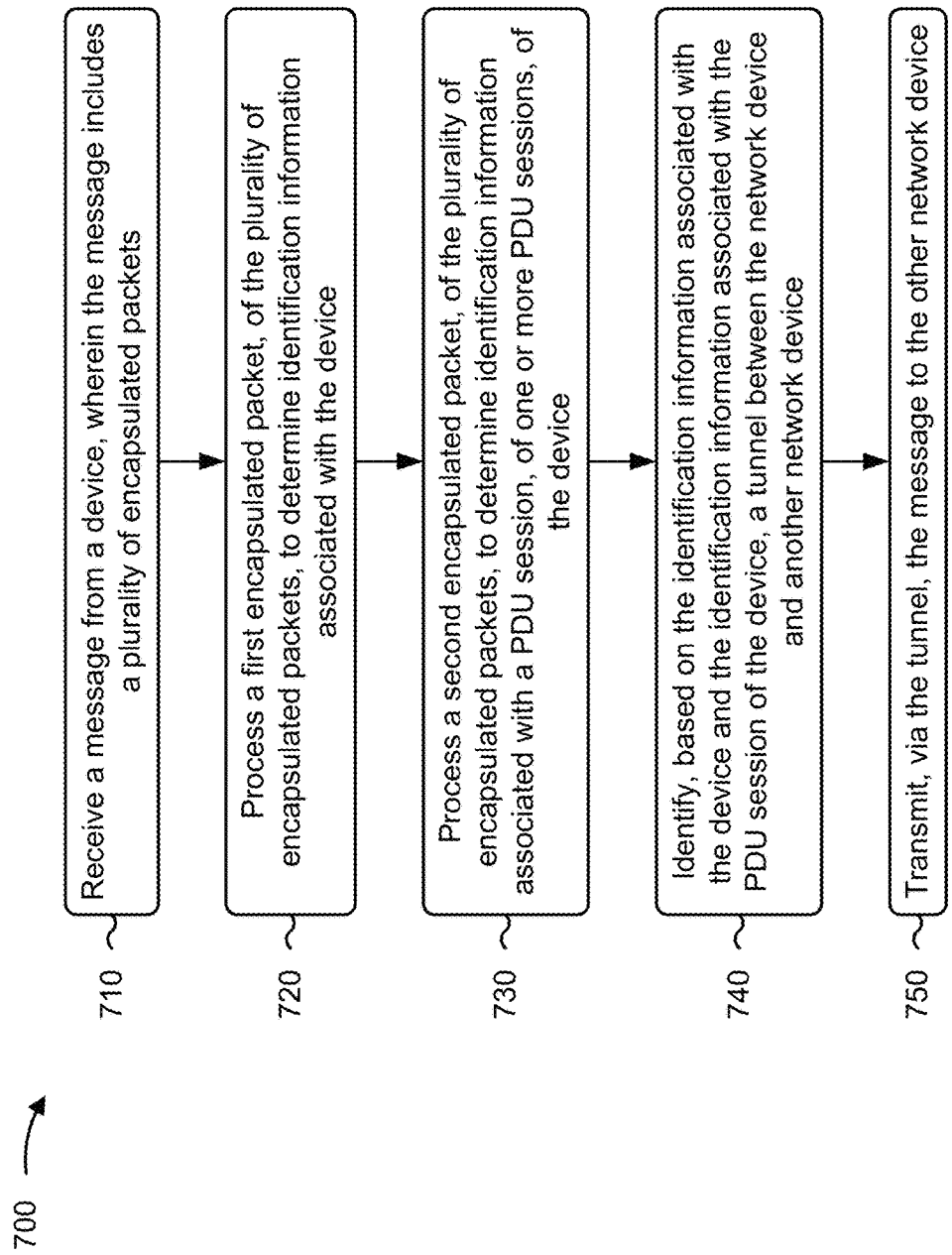

FIG. 7 is a flow chart of an example process 700 for supporting multiple PDU sessions for 5G client devices on wireline access. In some implementations, one or more process blocks of FIG. 7 may be performed by a network device (e.g., AGF 255) of a core network (e.g., core network 215). In some implementations, one or more process blocks of FIG. 5 may be performed by another device or a group of devices separate from or including the network device, such as one or more other network devices of the core network.

As shown in FIG. 7, process 700 may include receiving a message from a device, wherein the message includes a plurality of encapsulated packets (block 710). For example, the network device (e.g., using processor 320, memory 330, storage component 340, input component 350, output component 360, communication interface 370, input component 410, switching component 420, output component 430, controller 440, and/or the like) may receive a message from a device, as described above. In some implementations, the message includes a plurality of encapsulated packets.

As further shown in FIG. 7, process 700 may include processing a first encapsulated packet, of the plurality of encapsulated packets, to determine identification information associated with the device (block 720). For example, the network device (e.g., using processor 320, memory 330, storage component 340, input component 350, output component 360, communication interface 370, input component 410, switching component 420, output component 430, controller 440, and/or the like) may process a first encapsulated packet, of the plurality of encapsulated packets, to determine identification information associated with the device, as described above.

As further shown in FIG. 7, process 700 may include processing a second encapsulated packet, of the plurality of encapsulated packets, to determine identification information associated with a PDU session, of one or more PDU sessions, of the device (block 730). For example, the network device (e.g., using processor 320, memory 330, storage component 340, input component 350, output component 360, communication interface 370, input component 410, switching component 420, output component 430, controller 440, and/or the like) may process a second encapsulated packet, of the plurality of encapsulated packets, to determine identification information associated with a PDU session, of one or more PDU sessions, of the device, as described above.

As further shown in FIG. 7, process 700 may include identifying, based on the identification information associated with the device and the identification information associated with the PDU session of the device, a tunnel between the network device and another network device (block 740). For example, the network device (e.g., using processor 320, memory 330, storage component 340, input component 350, output component 360, communication interface 370, input component 410, switching component 420, output component 430, controller 440, and/or the like) may identify, based on the identification information associated with the device and the identification information associated with the PDU session of the device, a tunnel between the network device and another network device, as described above.

As further shown in FIG. 7, process 700 may include transmitting, via the tunnel, the message to the other network device (block 750). For example, the network device (e.g., using processor 320, memory 330, storage component 340, input component 350, output component 360, communication interface 370, input component 410, switching component 420, output component 430, controller 440, and/or the like) may transmit, via the tunnel, the message to the other network device, as described above.

Process 700 may include additional implementations, such as any single implementation or any combination of implementations described below and/or in connection with one or more other processes described elsewhere herein.

In a first implementation, processing the first encapsulated packet to determine the identification information associated with the device includes processing the first encapsulated packet to identify a session identifier and a tunnel identifier included in the first encapsulated packet, and determining, based on the session identifier and the tunnel identifier, the identification information associated with the device.

In a second implementation, alone or in combination with the first implementation, the tunnel is a general packet radio service tunneling protocol tunnel.

In a third implementation, alone or in combination with one or more of the first and second implementations, identifying the tunnel between the network device and the other network device includes locating, in a data structure and based on the identification information associated with the device and the identification information associated with the PDU session of the device, an entry associated with the tunnel, wherein the entry indicates that the tunnel is to transmit traffic to and from the device for the PDU session, and processing the entry to identify the tunnel.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
 receiving, by a network device, a message from a device;

processing, by the network device, the message to determine identification information associated with the device,
  wherein the message includes an encapsulated packet that encapsulates a 5G data packet;
processing, by the network device, the message to determine identification information associated with a packet data unit (PDU) session, of one or more PDU sessions, of the device,
  wherein processing the message to determine the identification information associated with the device comprises:
    processing the 5G data packet to identify a PDU session identifier included in the 5G data packet, and
    determining, based on the PDU session identifier, the identification information associated with the PDU session of the device; and
transmitting, by the network device, based on the identification information associated with the device and the identification information associated with the PDU session of the device, the message to another network device,
  wherein the message is transmitted via a tunnel, between the network device and the other network device, identified based on the identification information.

2. The method of claim 1, wherein the message includes an Ethernet packet,
  wherein the Ethernet packet encapsulates a point-to-point protocol over Ethernet (PPPoE) packet,
  wherein the PPPoE packet encapsulates a point-to-point protocol (PPP) packet, and
  wherein the PPP packet encapsulates the 5G data packet.

3. The method of claim 2, wherein processing the message to determine the identification information associated with the device comprises:
  processing the PPPoE packet to identify a session identifier included in the PPPoE packet; and
  determining, based on the session identifier, the identification information associated with the device.

4. The method of claim 1, wherein the message includes an Ethernet packet,
  wherein the Ethernet packet encapsulates an (Internet protocol) IP packet,
  wherein the IP packet encapsulates a user datagram protocol (UDP) packet,
  wherein the UDP packet encapsulates a layer 2 tunneling protocol (L2TP) packet,
  wherein the L2TP packet encapsulates a point-to-point protocol (PPP) packet, and
  wherein the PPP packet encapsulates the 5G data packet.

5. The method of claim 4, wherein processing the message to determine the identification information associated with the device comprises:
  processing the L2TP packet to identify a tunnel identifier and a session identifier included in the L2TP packet; and
  determining, based on the tunnel identifier and the session identifier, the identification information associated with the device.

6. The method of claim 1, wherein transmitting, based on the identification information associated with the device and identification information associated with the PDU session of the device, the message to the other network device comprises:
  identifying, based on the identification information associated with the network device and identification information associated with the PDU session of the device, the tunnel; and
  transmitting, via the tunnel, the message to the other network device.

7. The method of claim 1, further comprising:
receiving, via the tunnel, an additional message from the other network device;
processing the additional message to identify identification information associated with the other network device;
processing the additional message to identify identification information associated with the tunnel; and
transmitting, based on the identification information associated with the other network device and the identification information associated with the tunnel, the additional message to the device.

8. The method of claim 1, further comprising:
receiving, via the tunnel, an additional message from the other network device;
processing the additional message to identify identification information associated with the other network device;
processing the additional message to identify identification information associated with the tunnel;
determining, based on the identification information associated with the other network device and the identification information associated with the tunnel, the identification information associated with the device and the identification information associated with the PDU session of the device; and
transmitting, based on the identification information associated with the device and the identification information associated with the PDU session of the device, the additional message to the device.

9. The method of claim 1, wherein processing the message to determine the identification information associated with the device comprises:
  scanning a data structure for an entry associated with the PDU session identifier.

10. The method of claim 1, further comprising:
locating, in a data structure and based on the identification information associated with the device and the identification information associated with the PDU session of the device, an entry associated with the tunnel,
  wherein the entry indicates that the tunnel is to transmit traffic to and from the device for the PDU session; and
processing the entry to identify the tunnel.

11. A network device, comprising:
one or more memories; and
one or more processors to:
receive a message from a device,
  wherein the message includes a plurality of encapsulated packets;
process a first encapsulated packet, of the plurality of encapsulated packets, to determine identification information associated with the device;
process a second encapsulated packet, of the plurality of encapsulated packets, to determine identification information associated with a packet data unit (PDU) session, of one or more PDU sessions, of the device,
  wherein the one or more processors, when processing the second encapsulated packet to determine the identification information associated with the PDU session, are to:

process a 5G data packet to identify a PDU session identifier included in the 5G data packet, and
determine, based on the PDU session identifier, the identification information associated with the PDU session of the device; and
transmit, based on the identification information associated with the device and the identification information associated with the PDU session of the device, the message to another network device,
wherein the message is transmitted via a tunnel identified based on the identification information.

12. The network device of claim 11, wherein the one or more processors, when processing the second encapsulated packet to determine the identification information associated with the PDU session of the device, are to:
process the second encapsulated packet to identify a PDU session identifier included in the second encapsulated packet; and
determine, based on the PDU session identifier, the identification information associated with the PDU session of the device.

13. The network device of claim 11, wherein the first encapsulated packet is a point-to-point protocol over Ethernet (PPPoE) packet and the second encapsulated packet is the 5G data packet.

14. The network device of claim 11, wherein the first encapsulated packet is a layer 2 tunneling protocol (L2TP) packet and the second encapsulated packet is the 5G data packet.

15. The network device of claim 11, wherein the network device is an access gateway function associated with a 5G network and the device is a 5G residential gateway.

16. The network device of claim 11, wherein the one or more processors are further configured to:
identify, based on the identification information associated with the device and the identification information associated with the PDU session of the device, a tunnel between the network device and another network device.

17. The network device of claim 11, wherein the tunnel is a general packet radio service tunneling protocol tunnel.

18. A non-transitory computer-readable medium storing instructions, the instructions comprising:
one or more instructions that, when executed by one or more processors of a network device, cause the one or more processors to:
receive a message from a device,
wherein the message includes a plurality of encapsulated packets;
process a first encapsulated packet, of the plurality of encapsulated packets, to determine identification information associated with the device;
process a second encapsulated packet, of the plurality of encapsulated packets, to determine identification information associated with a packet data unit (PDU) session, of one or more PDU sessions, of the device,
wherein the one or more instructions, that cause the one or more processors to process the second encapsulated packet to determine the identification information associated with the PDU session, cause the one or more processors to:
process a 5G data packet to identify a PDU session identifier included in the 5G data packet, and
determine, based on the PDU session identifier, the identification information associated with the PDU session of the device;
identify, based on the identification information associated with the device and the identification information associated with the PDU session of the device, a tunnel between the network device and another network device; and
transmit, via the tunnel, the message to the other network device.

19. The non-transitory computer-readable medium of claim 18, wherein the tunnel is a general packet radio service tunneling protocol tunnel.

20. The non-transitory computer-readable medium of claim 18, wherein the one or more instructions, that cause the one or more processors to identify the tunnel between the network device and the other network device, cause the one or more processors to:
locate, in a data structure and based on the identification information associated with the device and the identification information associated with the PDU session of the device, an entry associated with the tunnel,
wherein the entry indicates that the tunnel is to transmit traffic to and from the device for the PDU session; and
process the entry to identify the tunnel.

* * * * *